US008270769B2

(12) United States Patent
Judelson

(10) Patent No.: US 8,270,769 B2
(45) Date of Patent: Sep. 18, 2012

(54) SYSTEM AND METHOD FOR SIMULTANEOUSLY VIEWING, COORDINATING, MANIPULATING AND INTERPRETING THREE-DIMENSIONAL AND TWO-DIMENSIONAL DIGITAL IMAGES OF STRUCTURES FOR PROVIDING TRUE SCALE MEASUREMENTS AND PERMITTING RAPID EMERGENCY INFORMATION DISTRIBUTION

(75) Inventor: David N. Judelson, New York, NY (US)

(73) Assignee: Archaio, LLC, New York, NY (US)

( * ) Notice: Subject to any disclaimer, the term of this patent is extended or adjusted under 35 U.S.C. 154(b) by 0 days.

(21) Appl. No.: 13/077,244

(22) Filed: Mar. 31, 2011

(65) Prior Publication Data

US 2011/0176179 A1 Jul. 21, 2011

Related U.S. Application Data

(63) Continuation of application No. 12/610,441, filed on Nov. 2, 2009, now Pat. No. 8,050,521, and a continuation-in-part of application No. 11/068,268, filed on Feb. 28, 2005, now Pat. No. 7,634,156, and a continuation-in-part of application No. 10/629,347, filed on Jul. 28, 2003, now Pat. No. 7,672,009.

(60) Provisional application No. 60/547,790, filed on Feb. 27, 2004, provisional application No. 60/398,927, filed on Jul. 27, 2002.

(51) Int. Cl.
*G06K 9/00* (2006.01)
*G06K 9/50* (2006.01)
*G06K 9/36* (2006.01)
*G06K 9/32* (2006.01)
*G09G 5/00* (2006.01)
*H04N 9/74* (2006.01)

(52) U.S. Cl. ........ 382/293; 382/100; 382/103; 382/113; 382/201; 382/285; 345/619; 348/580; 348/584

(58) Field of Classification Search .................. 382/100, 382/103, 113, 285, 201, 293; 345/619; 348/580, 348/584
See application file for complete search history.

(56) References Cited

U.S. PATENT DOCUMENTS 5,448,696 A 9/1995 Shimada et al.
(Continued)

OTHER PUBLICATIONS

Dimri, J., Gurumoorthy, B., "Handling Sectional Views in Volume-Based Approach to Automatically Construct 3D Solid From 2D Views", Computer-Aided Design 37, 2005, pp. 495-495.

(Continued)

*Primary Examiner* — Brian Q Le
*Assistant Examiner* — Jose M Torres
(74) *Attorney, Agent, or Firm* — Keith D. Nowak, Esq.; Carter Ledyard & Milburn LLP

(57) ABSTRACT

The present invention provides a true-scale, coordinate-matched, linked in real-time, dual three-dimensional/two-dimensional visual display/viewer. The display simultaneously shows a 3D digital image and an associated 2D digital image of a selected drawing. The display of the present invention allows a user to visualize an asset's location, surrounding environment and hazards and true scale structural details for interior or external structural scenes. Using the display and associated tools, the user can obtain real-time information of an environment, true-scale measurement, plan ingress/egress paths, shortest paths between points and the number of doorways in a structure and track objects within the displayed environment. The intelligence gained using the tools and 3D/2D display may be used and further manipulated by a single user or may be distributed to other users.

9 Claims, 20 Drawing Sheets

U.S. PATENT DOCUMENTS

| | | | |
|---|---|---|---|
| 6,134,338 A | 10/2000 | Solberg et al. | |
| 6,321,158 B1 | 11/2001 | DeLorme et al. | |
| 7,047,014 B1 | 5/2006 | Friday et al. | |
| 7,134,088 B2 | 11/2006 | Larsen | |
| 7,259,778 B2 * | 8/2007 | Arpa et al. | 348/139 |
| 7,605,696 B2 * | 10/2009 | Quatro | 340/539.13 |
| 8,050,521 B2 * | 11/2011 | Judelson | 382/293 |
| 2002/0050988 A1 | 5/2002 | Petrov et al. | |
| 2003/0031375 A1 | 2/2003 | Enomoto | |
| 2004/0022444 A1 | 2/2004 | Rhoads | |
| 2004/0081340 A1 | 4/2004 | Hashimoto | |
| 2004/0100465 A1 | 5/2004 | Stowe et al. | |
| 2005/0104969 A1 | 5/2005 | Schoelkopf et al. | |
| 2008/0062167 A1 | 3/2008 | Boggs et al. | |

OTHER PUBLICATIONS

Dori, D., Tombre, K., "From Engineering Drawings to 3D CAD Models: Are We Ready Now?", Computer-Aided Design 27, 1995, pp. 243-254.

Karima, M. et al., "From Paper Drawings to Computer-Aided Design", IEEE, Computer Graphics and Applications, vol. 5, No. 2, 1985, pp. 27-39.

* cited by examiner

FIG. 4

SYSTEM AND METHOD FOR SIMULTANEOUSLY VIEWING, COORDINATING, MANIPULATING AND INTERPRETING THREE-DIMENSIONAL AND TWO-DIMENSIONAL DIGITAL IMAGES OF STRUCTURES FOR PROVIDING TRUE SCALE MEASUREMENTS AND PERMITTING RAPID EMERGENCY INFORMATION DISTRIBUTION

PRIORITY AND RELATED APPLICATIONS

The present invention is a continuation application of U.S. patent application Ser. No.: 12/610,441, filed Nov. 2, 2009, entitled "System And Method For Simultaneously Viewing, Coordinating, Manipulating And Interpreting Three-Dimensional And Two-Dimensional Digital Images Of Structures For Providing True Scale Measurements And Permitting Rapid Emergency Information Distribution"; which is a continuation-in-part of U.S. patent application Ser. No. 11/068,268, filed Feb. 28, 2005, entitled "System And Method For Rapid Emergency Information Distribution" now U.S. Pat. No. 7,634,156; which is a continuation-in-part of U.S. patent application Ser. No. 10/629,347, filed Jul. 28, 2003, entitled "Systems And Methods For Providing True Scale Measurements For Digitized Drawings" now U.S. Pat. No. 7,672,009; which claims the benefit of U.S. Provisional Patent Application Ser. No. 60/398,927, filed Jul. 27, 2002, entitled "Systems and Methods for Viewing and Modifying Digitized Drawings"; and further claims the benefit of U.S. Provisional Patent Application Ser. No. 60/547,790, filed Feb. 27, 2004, the contents of each are hereby incorporated by reference as if set fully herein. PCT application PCT/US2009/62918 entitled "System and Method Employing Three-Dimensional and Two-Dimensional Digital Images" was filed on November 2, 2009 concurrent with U.S. patent application Ser. No. 12/610,441.

FIELD OF THE INVENTION

The present invention relates generally to digital images, and more particularly, to the viewing of digital images.

BACKGROUND OF THE INVENTION

The scanning of paper documentation into digital images is well known. Some of the advantages of digital or electronic documents over paper documents include reduced storage space, immediate and simple copying, quick retrieval, easy sharing through electronic transfer (e.g., e-mail), persistent and non-volatile nature of a digital format, and the conservation of natural resources such as trees. While a completely digital office is not a reality for most businesses, it is rare to find a business that doesn't rely heavily on digital documents in the ordinary course of its business.

For example, property owners, land developers, architects, and document management professionals scan active and historical documents relating to properties, such as building blueprints, floor plans, and riser diagrams, to save space and enable more efficient copying and distribution of the documents. However, once a drawing is scanned, the scale information on the drawing is not computer recognizable when the digital version of the paper drawing is viewed on a monitor or display device. In particular, the digital image of the drawing is typically captured as a digital image having a certain pixel by pixel dimension with no direct or easy means to establish a relationship to the scale information contained on the original drawing. Thus, when the image is viewed using a monitor or display, it is virtually impossible for the user to obtain true measurement information from the rendered image because the scale of the paper drawing, for instance, one inch equals three feet, is not valid for the rendered image on the monitor or display.

Traditionally when paper plans are scanned and digitized for electronic storage, the images original physical size, and therefore the corresponding usefulness of the image scale, of a particular document is no longer a concrete attribute of the image. For example, if a paper version of an infrastructure plan is thirty inches in height and forty inches in width and then scanned, a computer user of that scanned electronic image would see the document as a different physical size when using different monitors depending on the size of the display device and its own pixel resolution. Thus, the scale that appears on the document (e.g., one eighth inch equals one foot, etc.) will be incorrect when an electronic depiction of the document is displayed on a computer monitor. This is because the original physical size of a paper image has no direct correlation to the pixel dimensions of a computer monitor. As a result, a 20 inch wide monitor can only display an image as twenty inches wide if viewing the whole image and a twenty-five inch wide monitor can only display an image as twenty-five inches wide if viewing the whole image. Also, neither monitor would be able to display the whole image as it originally appeared, that is, as a forty inch wide image. The user has no way to know what the original physical size of the paper drawing was, yet the scale ratio of the image listed on the plan is directly tied to the physical size of the original paper document. So if a computer user viewing the scanned infrastructure plan on a twenty-five inch monitor tried to take a physical measurement of the image on the computer monitor using that data with the image scale to manually compute a true scale measurement the result would be a wrong measurement value. Furthermore zooming the image so that only portions of the original image appear on the computer monitor also distorts the physical size of the image making any physical measurement of an image or image element not useful when combined with scale to calculate a true scale dimension measurement. In essence, once a paper drawing is scanned, the scale information on that drawing is no longer valid and accurate when a digital version of the paper drawing is viewed on a monitor or display device.

Accordingly, some of the utility inherent in paper documents is lost when the documents are digitized. This lost utility is particularly problematic when it is desirable to determine the measurements of a room, the length of a wall, or the square footage of a section of a floor, which is often the main reason for viewing the drawings. In addition, when annotating the digital drawing, it is often desirable to annotate where the graphic annotations retain a true scale ratio to the rendered subject matter represented on the digital image.

Thus, there exists an unsatisfied need in the industry for a means to view, and distribute a digital drawing with the ability to determine true and precise dimension information which accurately describes the rendered subject matter.

Also, it is known that event information regarding buildings can be displayed with the digital drawing of buildings. For instance, it is known that buildings can be provided with various alarm systems. U.S. patent application Ser. No. 10/434,390 discloses a method of displaying event information from a building system where the event is a non-normal condition generated within a building system. Information regarding the building is displayed on a display portion. The displayed information is selectable and changeable by a user. An alarm graphic can also be displayed which relates to a non-normal condition in a building. A user may elect to show a floor plan, which discloses the status of fire system alarm generating devices. However, while this graphic may be displayed, the user is unaware of the accurate to-scale spatial relationships that exist between people in the building, the non-normal condition, and the building's structural characteristics.

A responder assets management system (RAMS) is disclosed in U.S. patent application Ser. No. 10/038,572. The disclosed system utilizes information available to responders including emergency response personnel including local weather, national weather, and links to other information. The system also provides virtual walkthrough capability of a building or facility. However, while providing this virtual walkthrough, there is no ability for the user to scale and zoom to determine exact spatial relationships.

Finally, U.S. patent application Ser. No. 10/177,577 discloses a system and method for detecting monitoring and evaluating hazardous situations in a structure. Sensors having two-way communication capability are strategically located in a structure or in a matrix of structures. These units are high-level multi-functional detectors that communicate with a base computer. However, as with the other systems discussed above, there is no spatial relationship provided for users so that they can determine their exact relationship to the hazardous situations within a structure.

Spatial relationship is further indeterminable in the prior art due to the type of displays, viewers, or graphic view ports, used to view the graphically represented floor plans or drawings. Two traditional types of displays used in the prior art are either 2D displays or 3D displays. Though each display provides users individual benefits, these benefits are limited. For instance, a 2D display can be used by a user to plot a space with respect to the entire building or structure, however the 2D display cannot describe the complete geometry nor visual qualities of the interior of a room or passageway of a structure. In such cases, when a user is using the 2D display of a floor to plot entry or exit routes in a structure, details regarding the architecture and geometry of a particular route cannot be comprehensively determined as they could be in a true scale 3D animation or true scale 3D virtual representation of the space. Also, use of only 2D displays does not permit route adjustments to be made for architectural and hazardous elements visually identified in the building that arise along a navigated path. For example a 2D floor plan may indicate that a particular passage way is wide enough for a particular piece of equipment, however the actual height and architectural geometry of the passage way in all dimensions cannot be represented in the two dimensional representation. As a result emergency teams or other building system workers are being presented with incomplete data that can directly cause bad or hazardous decisions when using only the 2D floor plan as decision support tool.

The benefits of viewing a floor plan when using only a 3D display also is compromised as the user merely views the interior of a structure without being able to quickly identify the wall construction and embedded electrical, natural gas, and plumbing details. Additionally, users using 3D displays can only observe the spatial relationship for objects in a room that are directly in their cone of vision and are unaware of potentially hazardous/important adjoining room/area characteristics, including, but not limited to blocked passages, location of hazardous materials, alarm status and other critical items of importance.

The prior art provides for visualization of graphics either in 2D or in 3D in isolation, however a display is needed that provides improved viewing capabilities to take advantage of a novel visual data relationship created by the invention. Such a display would provide the cumulative advantage of both the 3D and 2D displays. Thus a display is needed that would create a synchronized true scale visual relationship between two related and connected but independent data perspectives in a way unseen in previous technologies. A display is needed that can form a symbiotic data visualization between true scale 3D and 2D displays, which is not realized when such displays are viewed independently, even when viewed in succession. Such a display would permit simultaneous display of a route in 3D and 2D with concurrent access to critical, measurable, spatial and relationship data via a true scale coordinate-linked display. It is also desired that such a display would produce an accurate, true scale measurement of the route.

BRIEF SUMMARY OF THE INVENTION

The present invention provides a true scale, coordinate matched, linked in real time, dual three-dimensional/two-dimensional visual display (viewer). The combined, simultaneous and real-time visual display of the present invention can be used to effectively assess risks, define safe and kill zones, visualize critical assets, alarms and sensor, hazards and true scale structural/architectural details for interior and/or external structural scenes. By combining 3D and 2D displays in a synchronized, coordinate-linked, true scale visual display, contextual location and spatial data are no longer mutually exclusive. Rather the combined 3D/2D display uses scale information embedded in the header of an image to enable a user to attain real time information that can be manipulated simultaneously in 3D and 2D provides a unique state of situational awareness and intelligence of the environment being viewed. The simultaneous display of the 3D and 2D views are independent of 3D and 2D window placement or size, fixed or floating.

The present invention also provides a measurement tool for use with an application suited for viewing a digitized drawing. The measurement tool computes lengths and areas (both regular shaped and irregular shaped areas) from a digital drawing in true scale. This is particularly advantageous with digitized architectural drawings or other drawings that are scanned from paper into a digital format where measuring or annotating the drawing in true scale is important and not easily maintained over time or recaptured if it is lost.

In an embodiment, the present invention comprises the steps of digitizing a paper document, capturing the scale data and the physical parameters of the paper being digitized (e.g., scanned), embedding the scale and physical parameter data in a header associated with the file of the digitized image, and then storing the digitized image. The present invention further provides for the processing of the header data when viewing the digitized image through a viewer application such that the header data can be used in calculating the true scale line lengths and areas. For example, when the digitized paper being viewed is a floor plan, then the header data can be used to measure distances and areas on the floor plan in true scale. Once the line is drawn, the true scale measurement is calculated using the header scale data, then it can be further converted to a desired unit of measurement and then presented to the user.

The step of capturing the scale and physical parameters of the paper being digitized comprises capturing the original scale information of the paper, the DPI of the scan, and the original size of the paper. If the paper is imaged as a TIFF file, then the captured data is stored in a private tag of the TIFF header using TIFF header tags. It is known by those of skill in the art that the TIFF header has both private and public TIFF header tags and that public tags are intended for a particular or singular data type while private tags must be registered to retain data for a particular purpose. For instance, public TIFF header tags for file size cannot be used to store other data such as description data or scale data. Private tags are open fields and do not have data that is intended to go in them unless they are registered tags. Private tags can be used by software developers or be registered to private companies so that particular tag can be used for one designated, well-defined purpose.

When viewing the TIFF image, a user can use the drawing tools that are a part of the viewer to draw a line or shape. The locations of the pixels that define the line or shape are captured by the viewer for use with the header data to calculate the true scale measured length of the line. As mentioned above, the present invention provides for the measurement of lengths (for both lines and polylines) and areas (for both regular shapes as well as irregular shapes, such as rectangles, polygons and inverse polygons). Other tools employed with the TIFF image include a Find Shortest Path tool that in part uses the embedded scale information in the TIFF header to calculate the shortest, fastest path between two user chosen or dynamically updated points marked on the 2D map or in the 3D rendering, the Find Shortest Path tool can also calculate and simultaneously display multiple routes between two user chosen or dynamically updated points e.g. the Primary (shortest) route, the Secondary (next shortest) route, and Tertiary (optional) route to allow for advanced contingency planning, a barrier tool that allows discreet pathways and entry/exit points to be manually or automatically marked as impassable, stairwells to be marked for attack or evacuation, and have those dynamic details trigger a recalculation of the shortest path. The 3D Record Path tool records a path navigated on a 3D window and simultaneously maps the path on the 2D display pane. Upon playback a Door Detection Tool automatically tabulates environmentally orientated doorways and passageways along an allotted path as a critical aid to emergency and response personnel operating in adverse conditions such as dark and smoked filled environments. Generated path can be stored and embedded in the digital file to facilitate planning, preparedness, simulated evacuations, and enhanced training.

In these changing times, it is imperative that in crisis situations, disaster response and the like emergency management personnel and building personnel have access to a building's plan to better protect the occupants, infrastructure and assets. What is needed is a system and method that gives emergency personnel the building architectural plans to scale in an interactive true-scale 3D and 2D visual environment, so that they are useful to the emergency personnel and enable multiple in-context situational awareness data points to be experienced by system users at a remote location. This ability has historically been reserved only for people within the physical structure itself. The system and method can be embodied in a software package.

The scale plans are useful to emergency personnel for planning ingress and egress routes for buildings or structures, including stadiums, arenas, bridges, tunnels, wharfs and the like. Additionally, point-to-point routing, manual or programmatic is easily determined.

The scale plans are useful to the public and emergency personnel for planning ingress and egress routes both before and during an emergency. To prepare for possible emergencies, building tenants or management can use the disclosed system to determine pre-arranged routes for entering and exiting the building while viewing such detail simultaneously in 3D and 2D. When an emergency occurs, emergency personnel can use the invention's dynamic searching and delivery capabilities to determine, in real time the routes to emergency exits. The system also allows emergency personnel to determine multiple routes presented in a hierarchical shortest to longest format to and from a specific building location or area, and allows them to access or block specific portions of the building in both 3D and 2D. The system allows the routes to be determined across multiple stories of a building, taking into consideration all human transportation infrastructures, e.g. building stairwells, and even from the exterior of a structure to any accessible location on any floor of a structure.

The current invention facilitates point-to-point routing within a structure, allowing personnel to identify exact measured routes for reaching a specific location. Emergency personnel will know how to get from point A to point B, and the exact distance they must travel along the route. For example, when a building is engulfed in smoke, fire personnel cannot see and must rely on other means to assess where they need to go. Utilizing this system, firefighters will know exactly how far to go in any given direction to reach a location. Similarly, in stadiums and arenas, security can utilize the disclosed system to pinpoint problem areas and address security situations that may arise. Both emergency personnel and tenants or other people in the building will be able to determine the location of emergency exits and routes to the exits. Various routes to emergency exits can be determined in real time using dynamic searching.

The invention can deliver the scale plan information in at least three ways. First, in one embodiment, the invention displays the information on a computer monitor screen or display device and allows users to pick selected points or areas using a pointing device, such as a mouse, stylus or other user directed selection device. Second, the invention can display the information on hand-held devices that personnel can carry. Third, the system can use a heads-up display, which displays the relevant information in a user's line of sight. Using the invention in this manner would aid firefighters who often work in situations involving reduced visibility. With the invention, a firefighter walking in darkness can view a heads-up display that details any needed information, including current location and routes to a desired destination.

At last, simultaneously 3D and 2D, to-scale displays can be used so that a planning board or planning personnel can determine access routes as well as containment strategies or other strategies. Utilizing the disclosed system, pre-arranged routes can be developed by building tenants or building management to determine ingress and egress routes which can increase fire safety preparedness, effectively for fire drills and training. Further, for stadiums, arenas, and the like, security can utilize the disclosed system to pinpoint problem areas and determine solutions to various security situations that may arise.

Users can implement the invention in at least three ways: (1) kiosks, (2) remote communication systems, and (3) an integrated system.

BRIEF DESCRIPTION OF THE DRAWING

Figure 1:
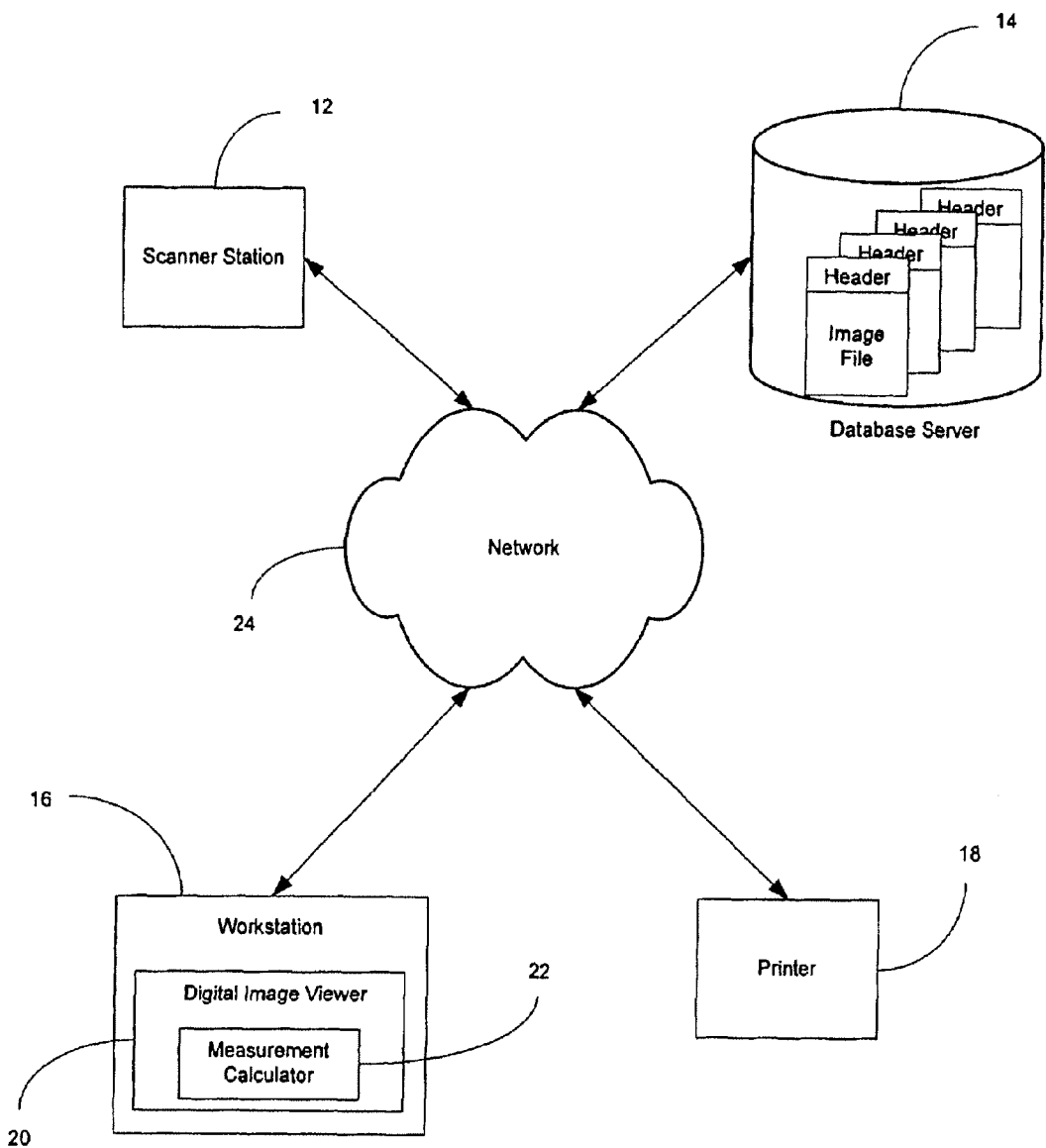

Having thus described the invention in general terms, reference will now be made to the accompanying drawings, which are not necessarily drawn to scale, and wherein:

FIG. 1 is a schematic block diagram illustrating a system in accordance with an embodiment with the present invention.

Figure 2:
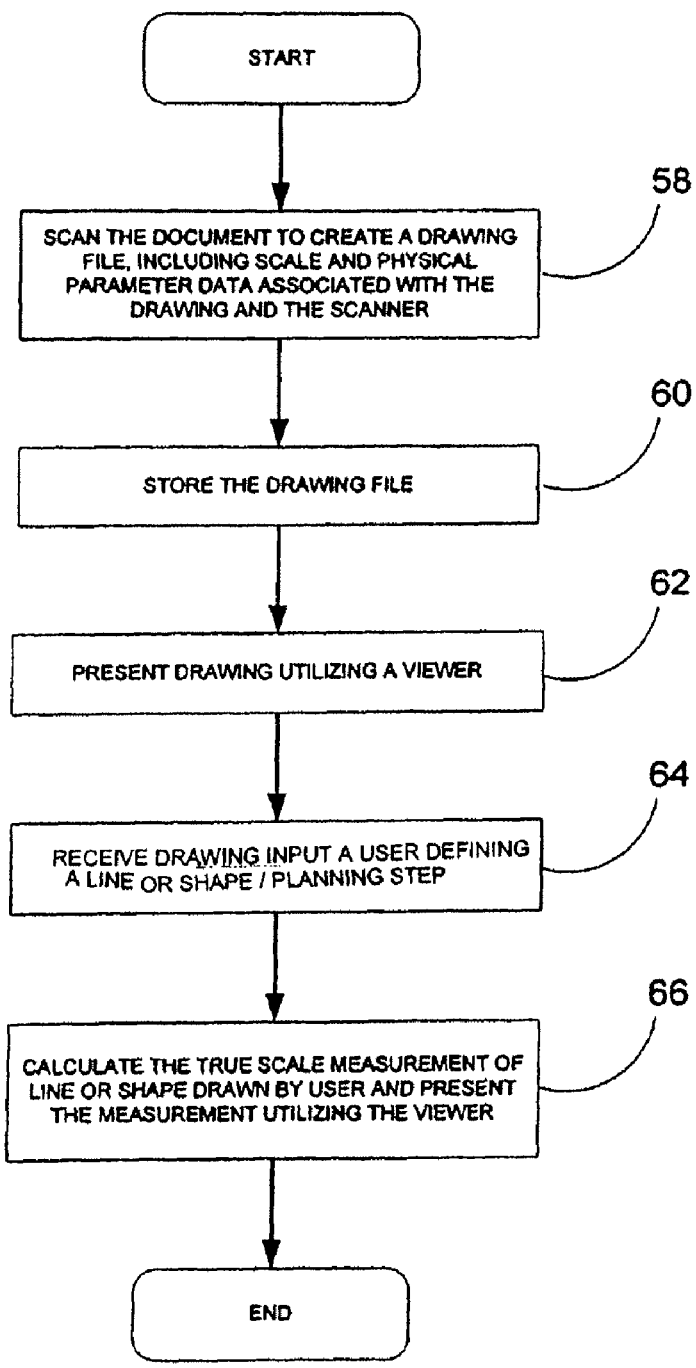

FIG. 2 is a flowchart of an embodiment of the present invention.

Figure 3:
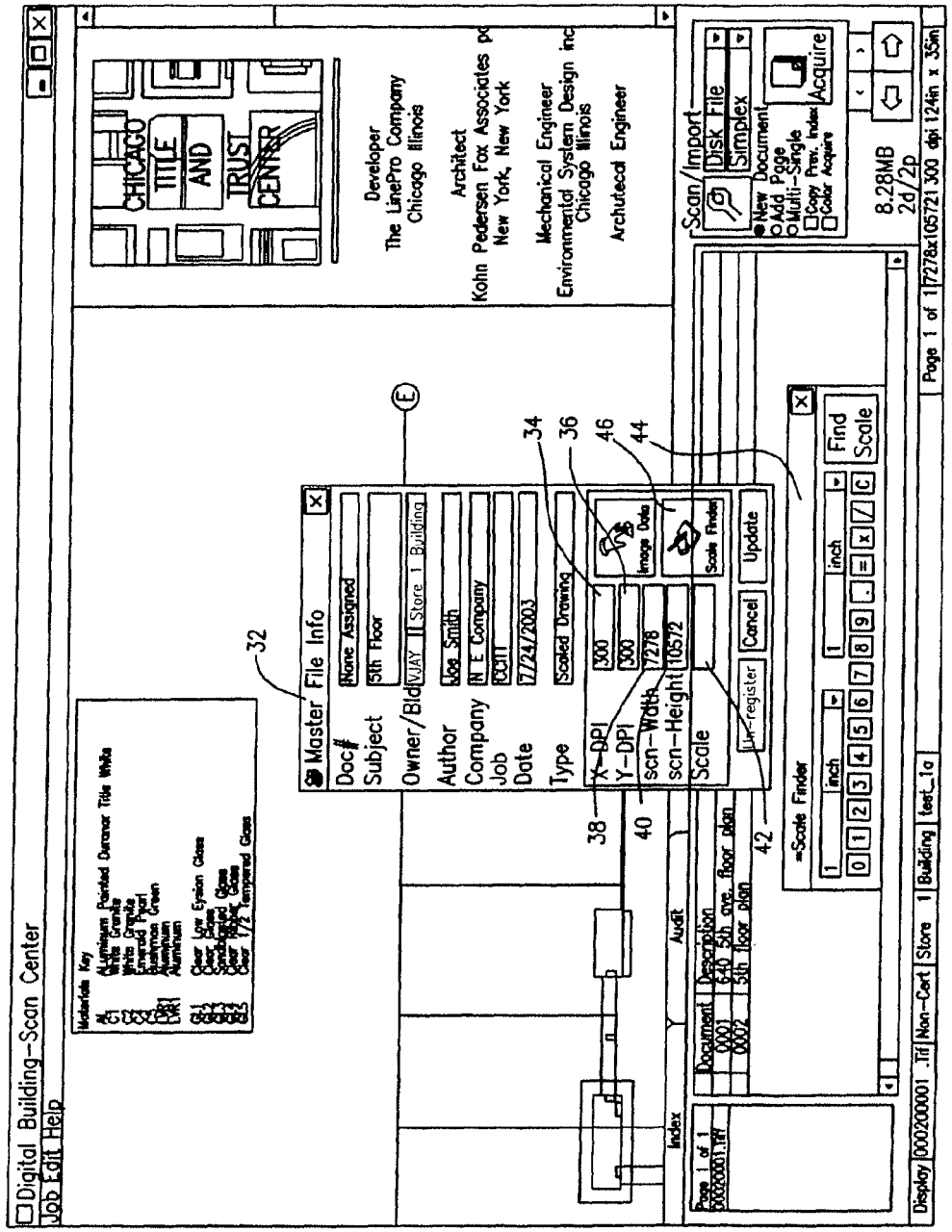

FIG. 3 is an illustrative user interface for inputting scale data associated with a scanned document, in accordance with an embodiment of the present invention.

Figure 4:
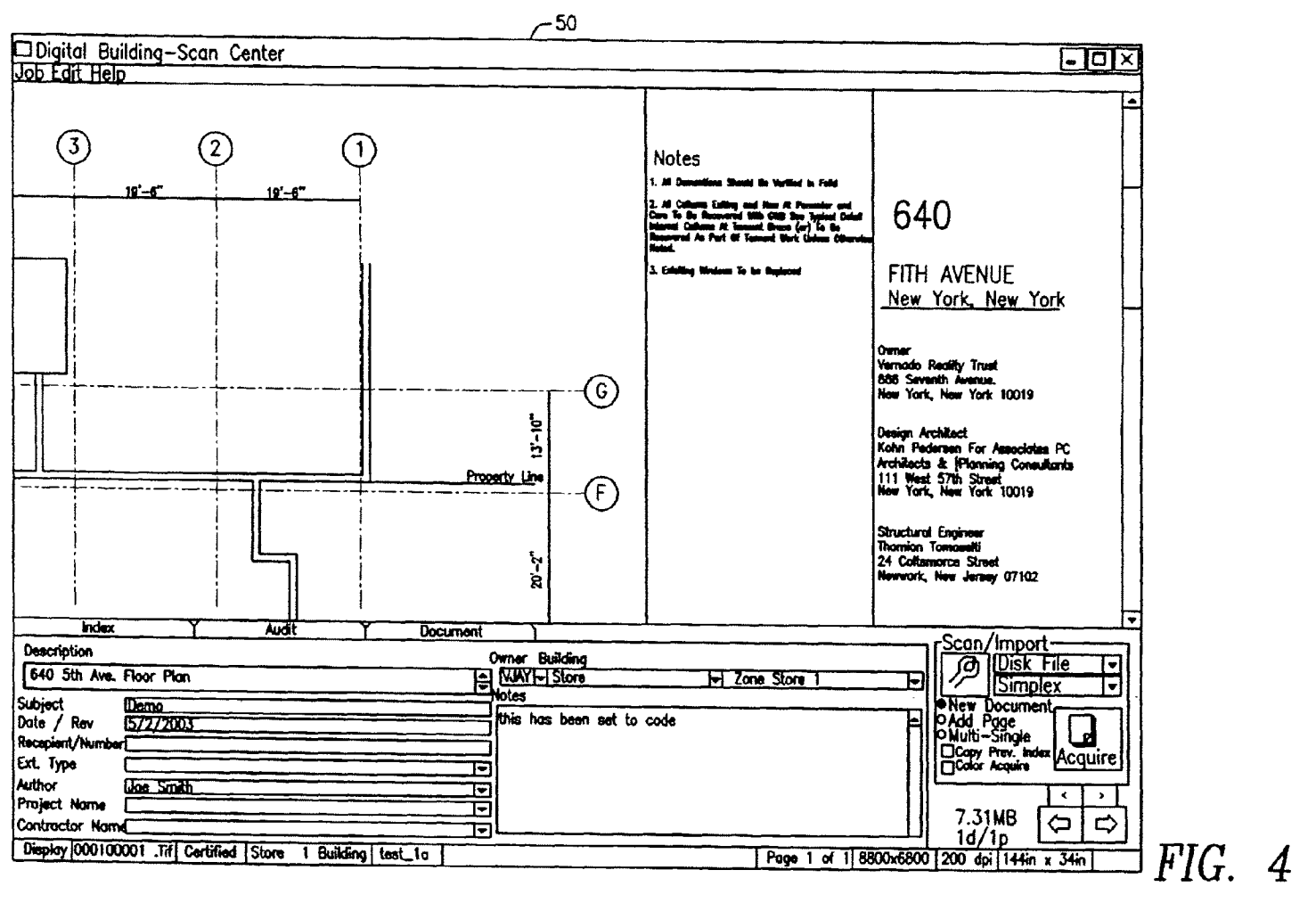

FIG. 4 is an illustrative user interface for inputting data associated with a scanned document, in accordance with an embodiment of the present invention.

Figure 5:
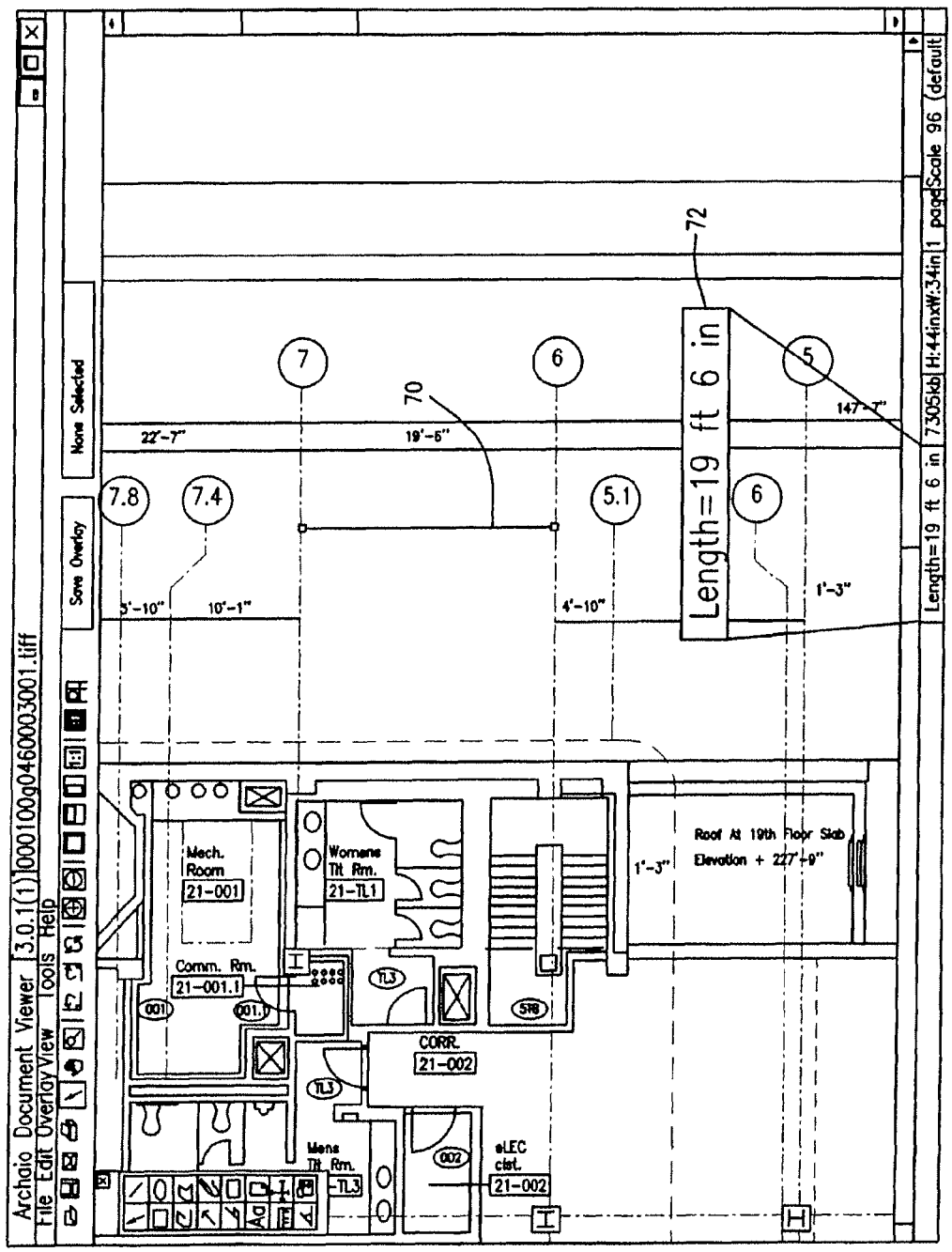

FIG. 5 is an illustrative user interface for viewing a scan document, wherein the user has drawn a line and the true scale measurement of the line is displayed to the user, in accordance with an embodiment of the present invention.

Figure 6:
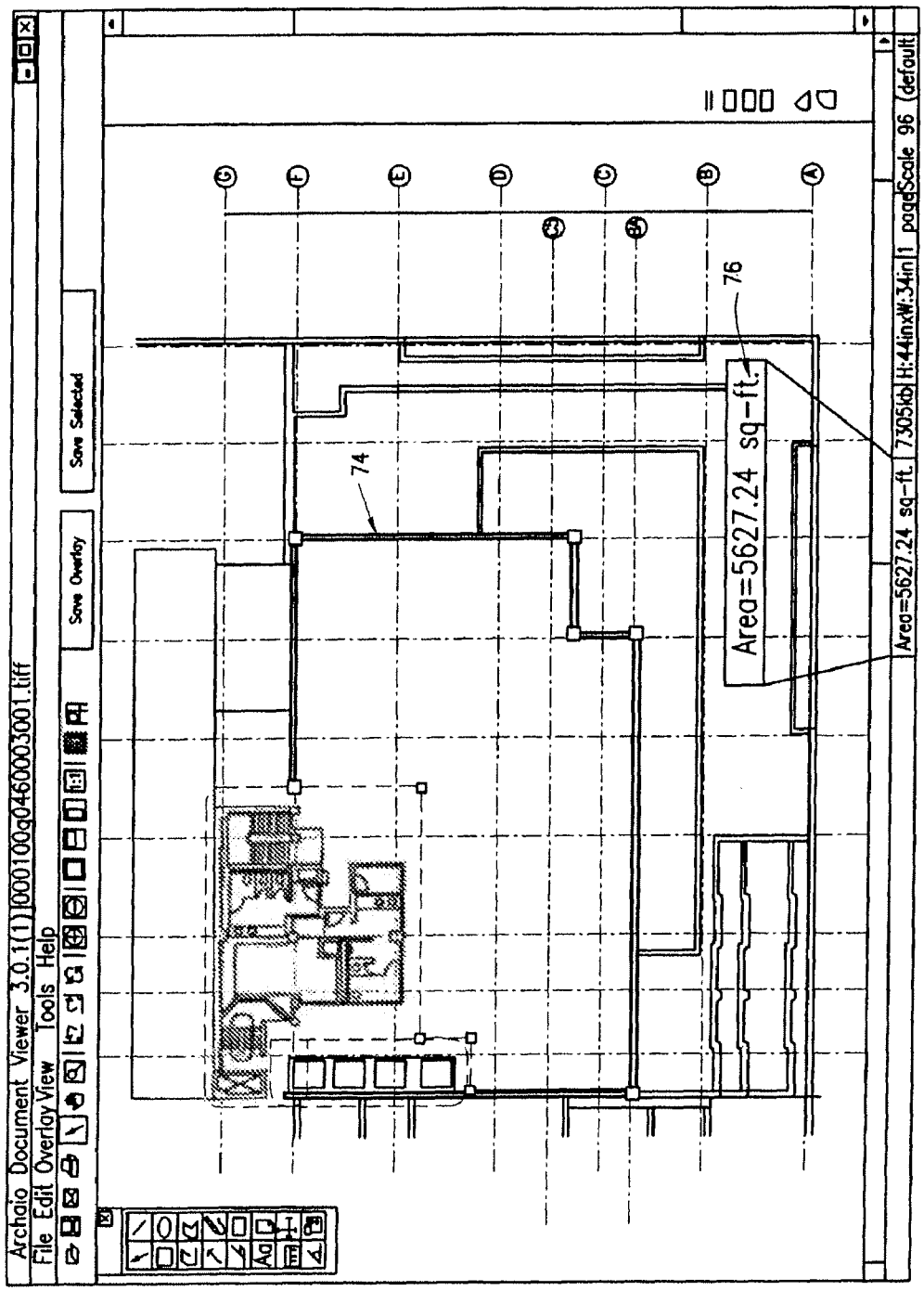

FIG. 6 is an illustrative user interface for viewing a scan document, wherein the user has drawn a polygon and the true scale measurement of the polygon is displayed to the user, in accordance with an embodiment of the present invention.

Figure 7:
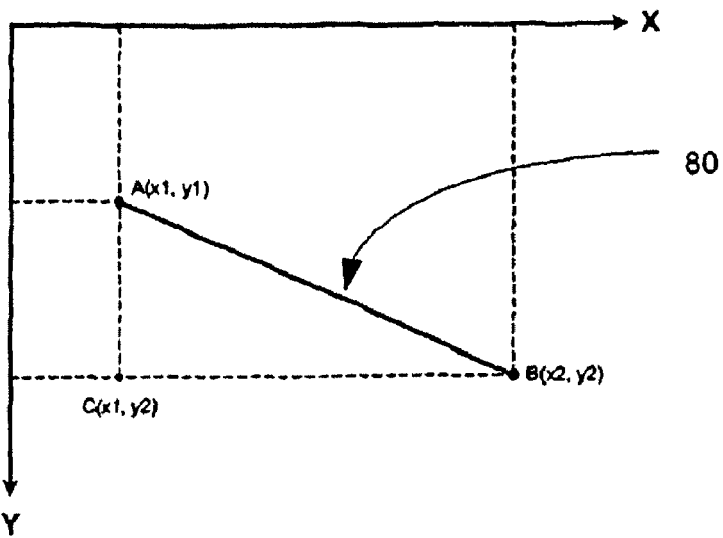

FIG. 7 is a schematic drawing illustrating the calculation of the length of a line, in accordance with an embodiment of the present invention.

Figure 8:
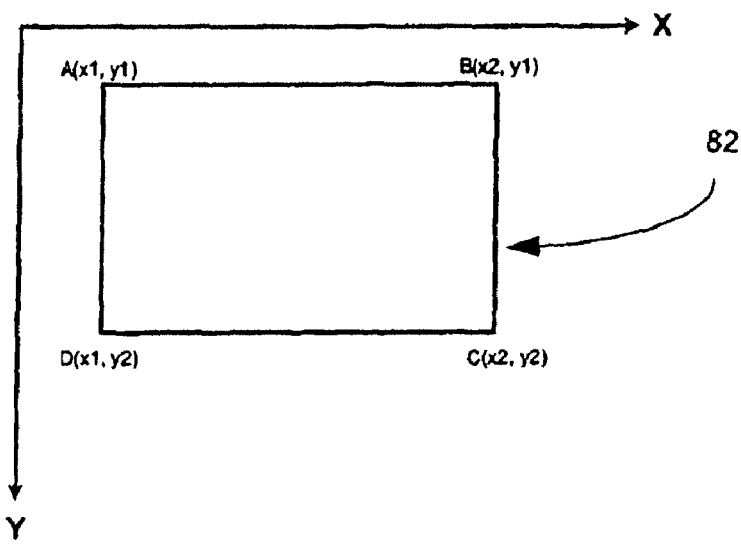

FIG. 8 is a schematic drawing illustrating the calculation of the area of a rectangle, in accordance with an embodiment of the present invention.

Figure 9:
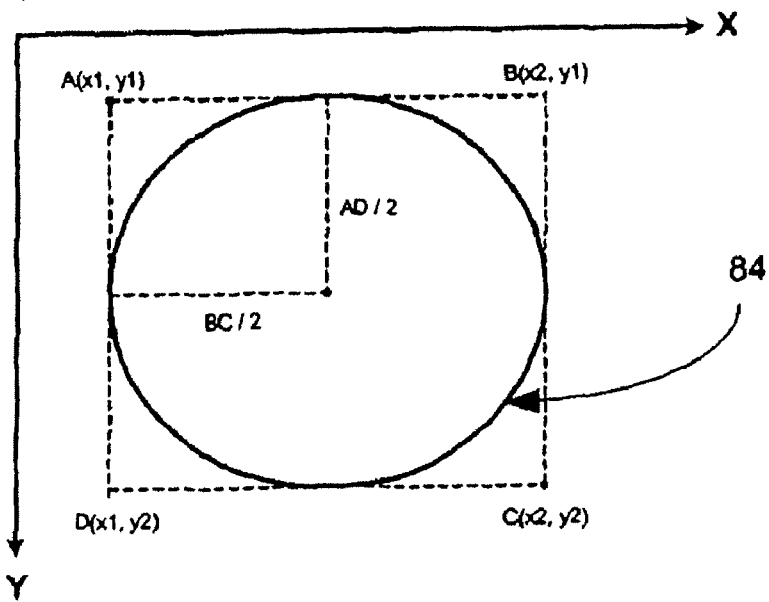

FIG. 9 is a schematic drawing illustrating the calculation of the area of an ellipse, in accordance with an embodiment of the present invention.

Figure 10:
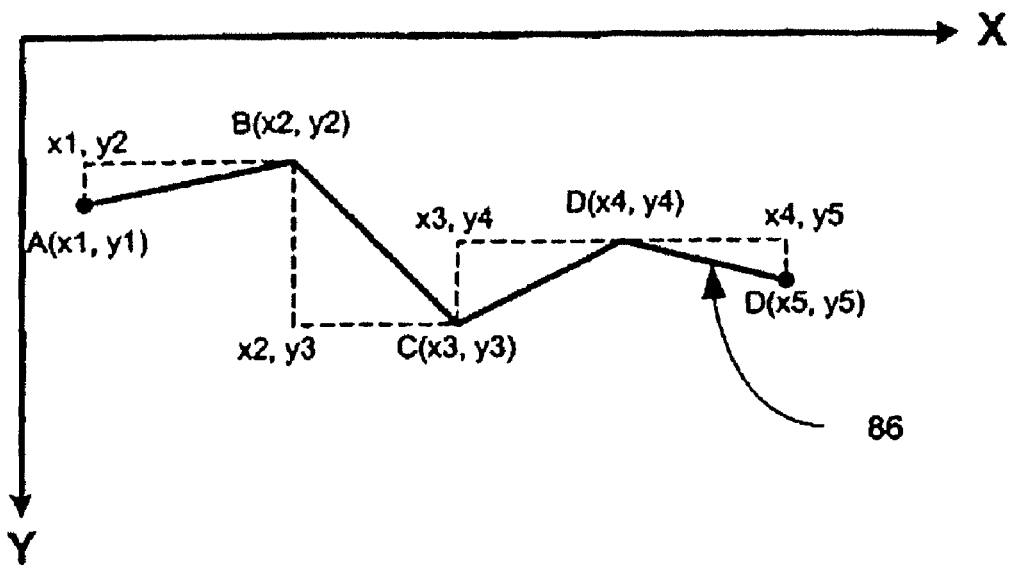

FIG. 10 is a schematic drawing illustrating the calculation of the length of a poly-line, in accordance with an embodiment of the present invention.

Figure 11:
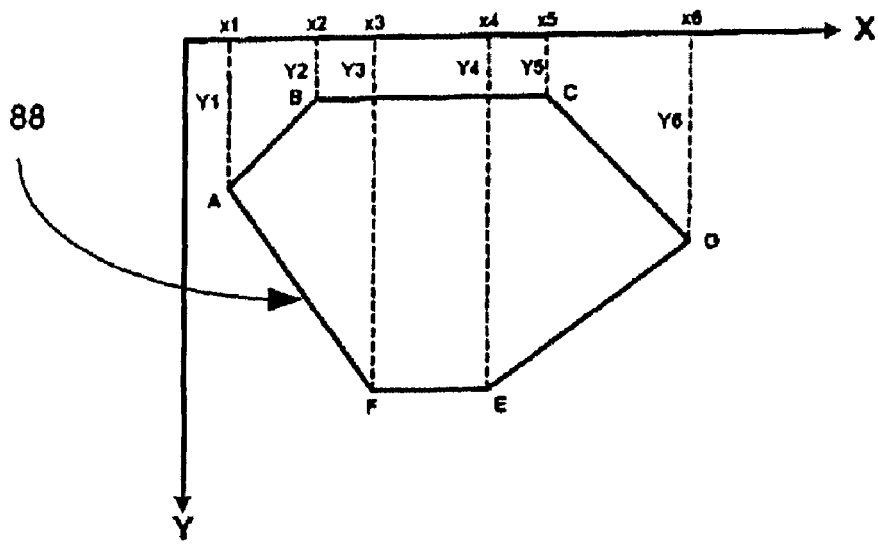

FIG. 11 is a schematic drawing illustrating the calculation of the area of a polygon, in accordance with an embodiment of the present invention.

Figure 12:
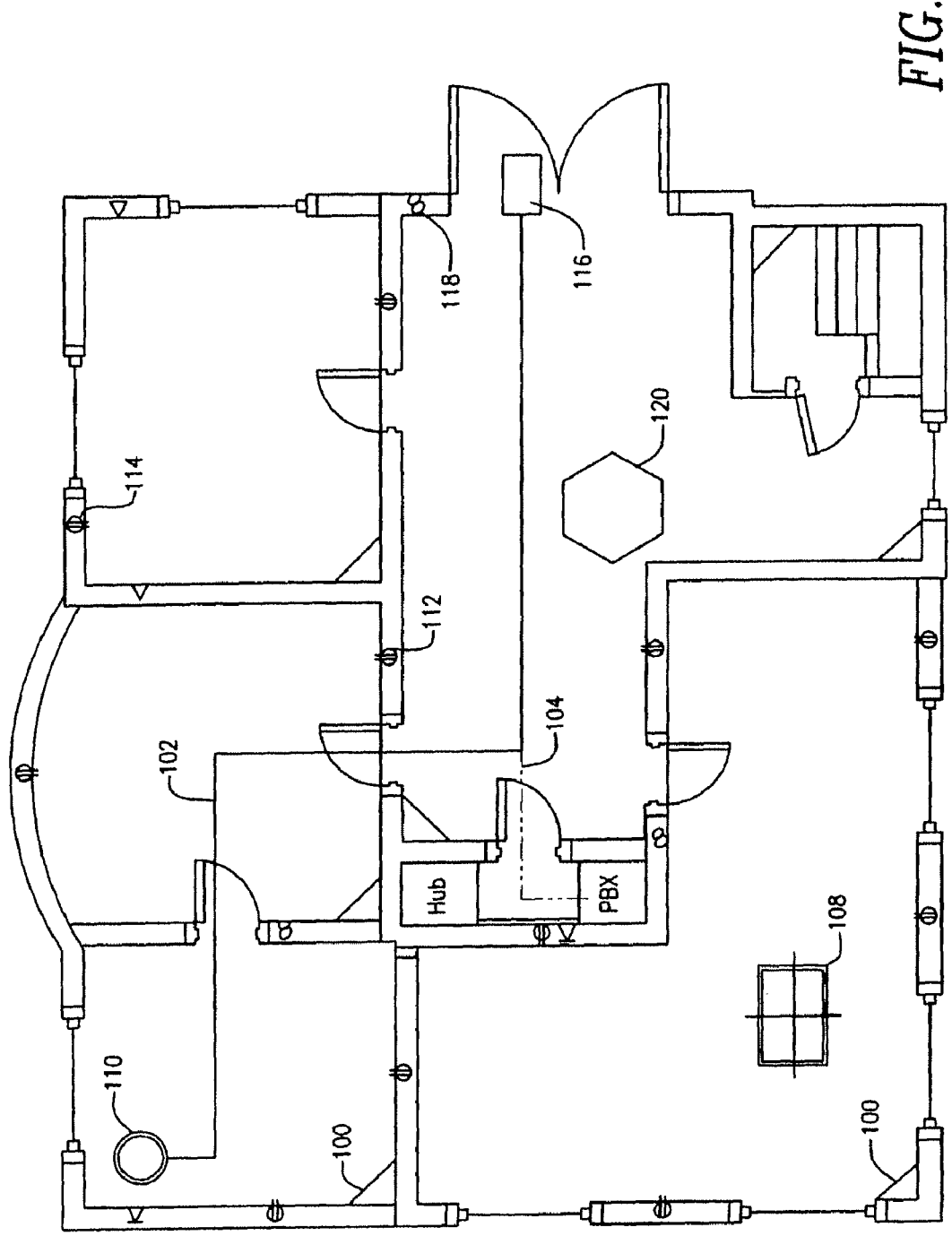

FIG. 12 is an illustration of a data display, in accordance with an embodiment of the present invention.

Figure 13:
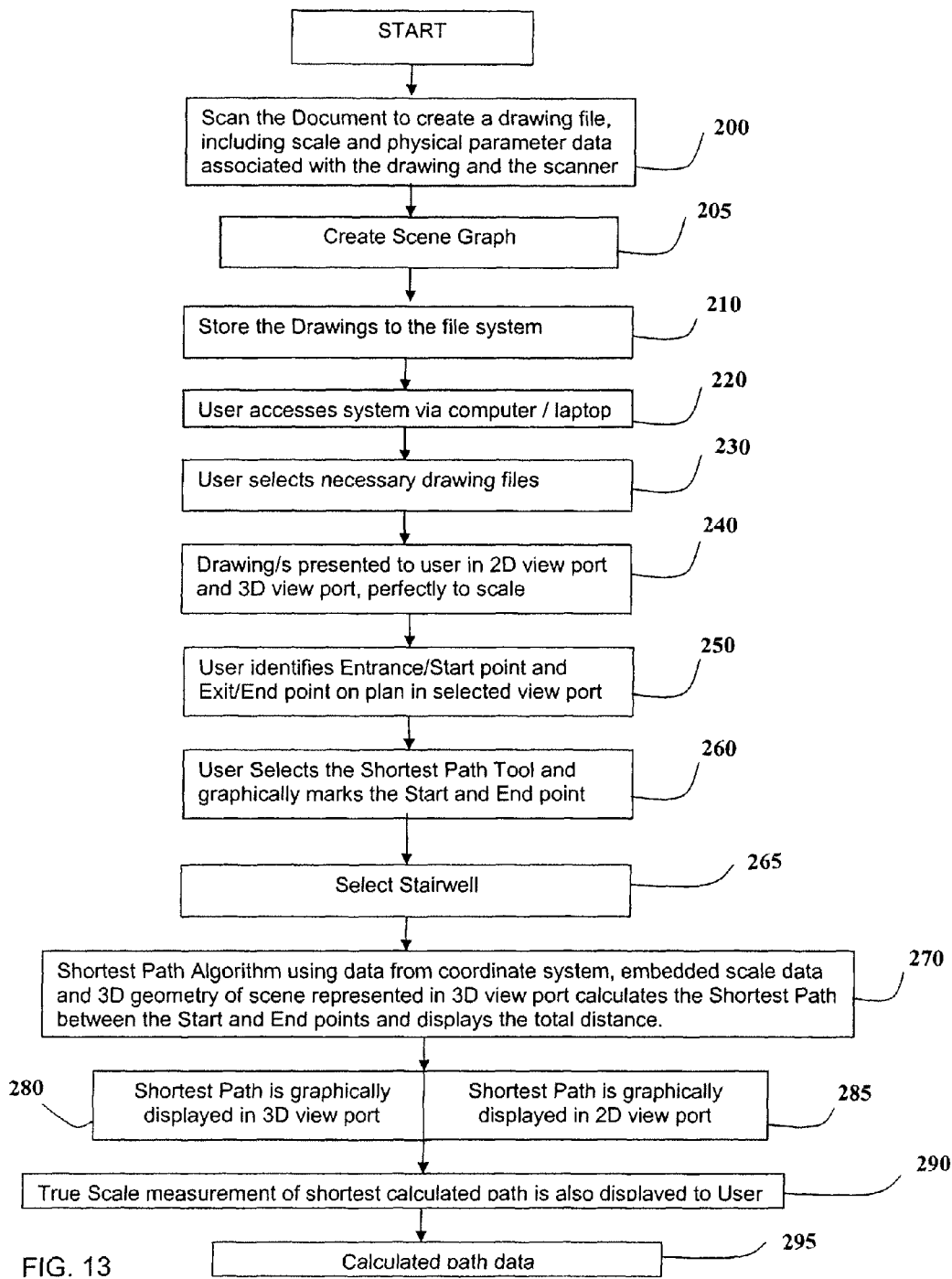

FIG. 13 is a flowchart of another embodiment of the present invention.

Figure 14:
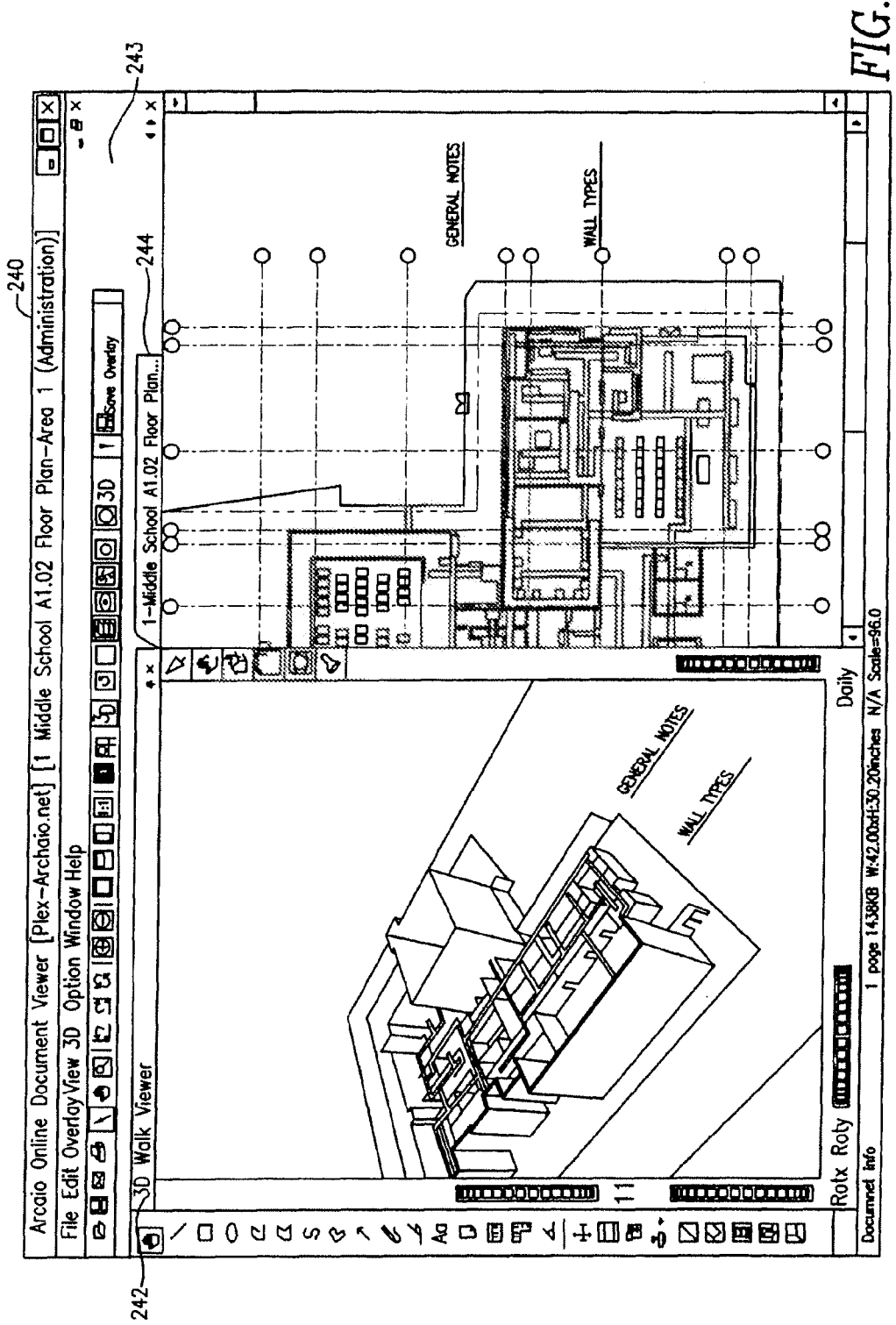

FIG. 14 is an illustrative user interface displaying a 3D/2D display/viewer.

Figure 15:
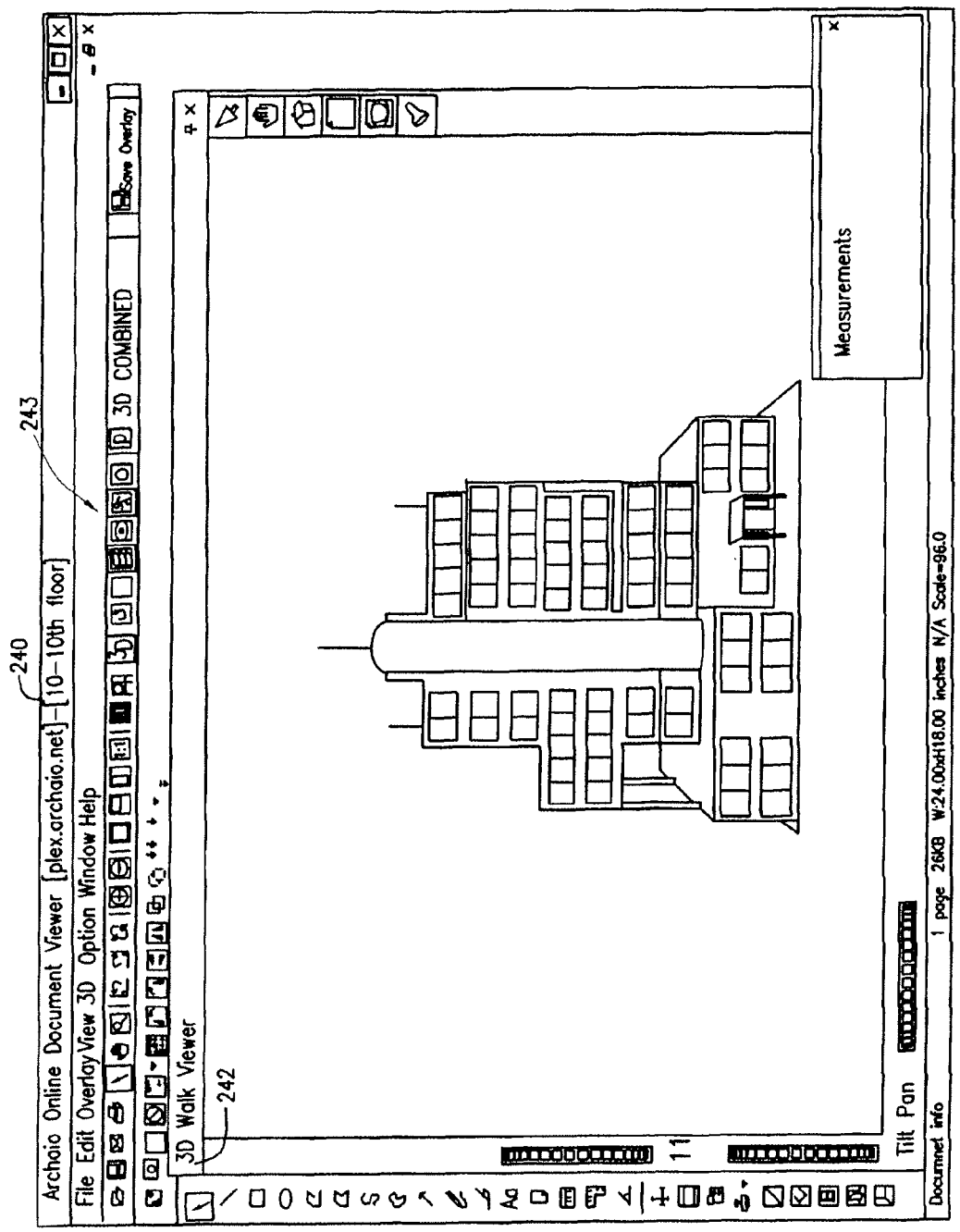

FIG. 15 is an illustrative user interface displaying only the 3D window of the display/viewer, as described in FIG. 13.

Figure 16:
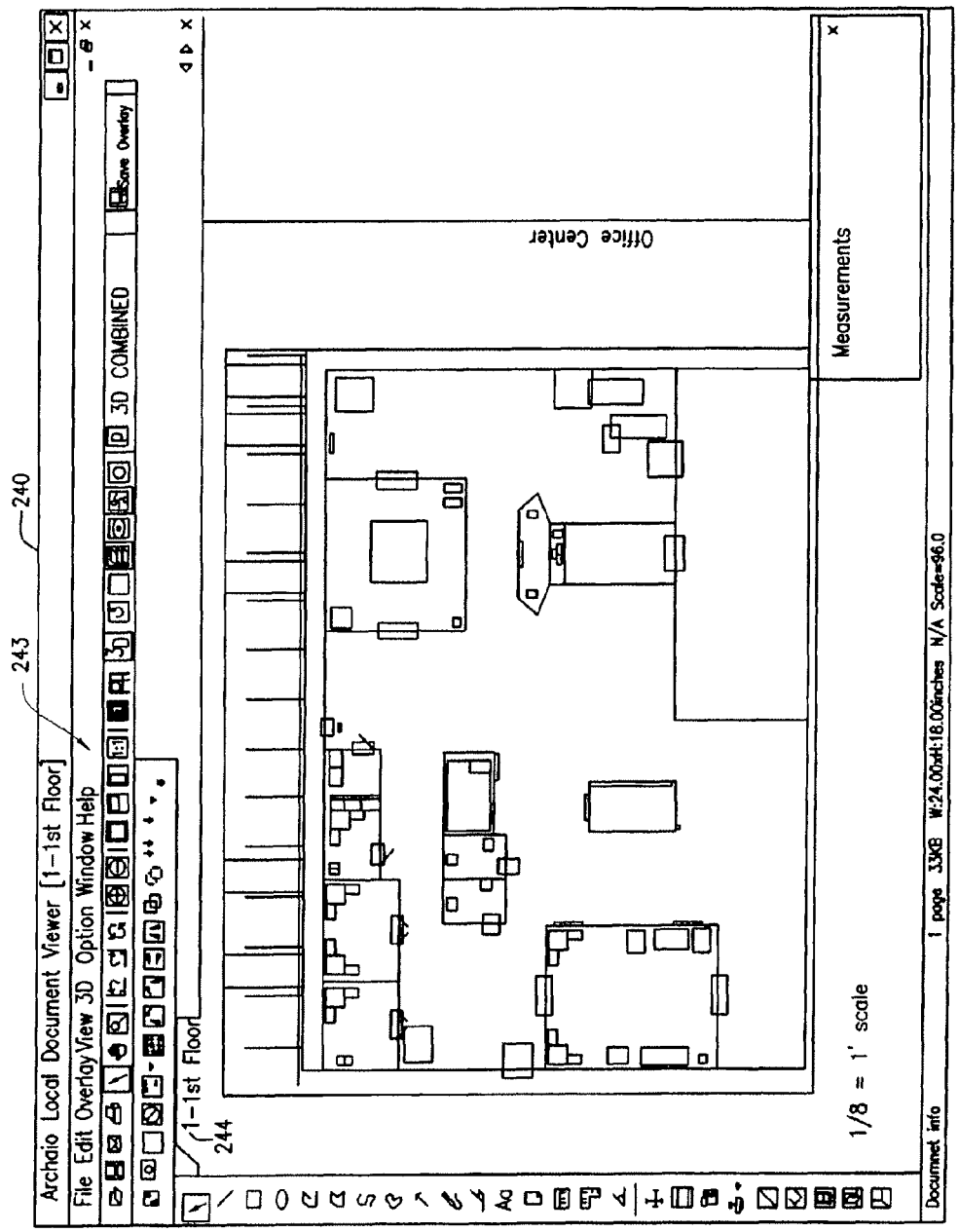

FIG. 16 is an illustrative user interface displaying only the 2D window of the display/viewer, as described in FIG. 13.

Figure 17:
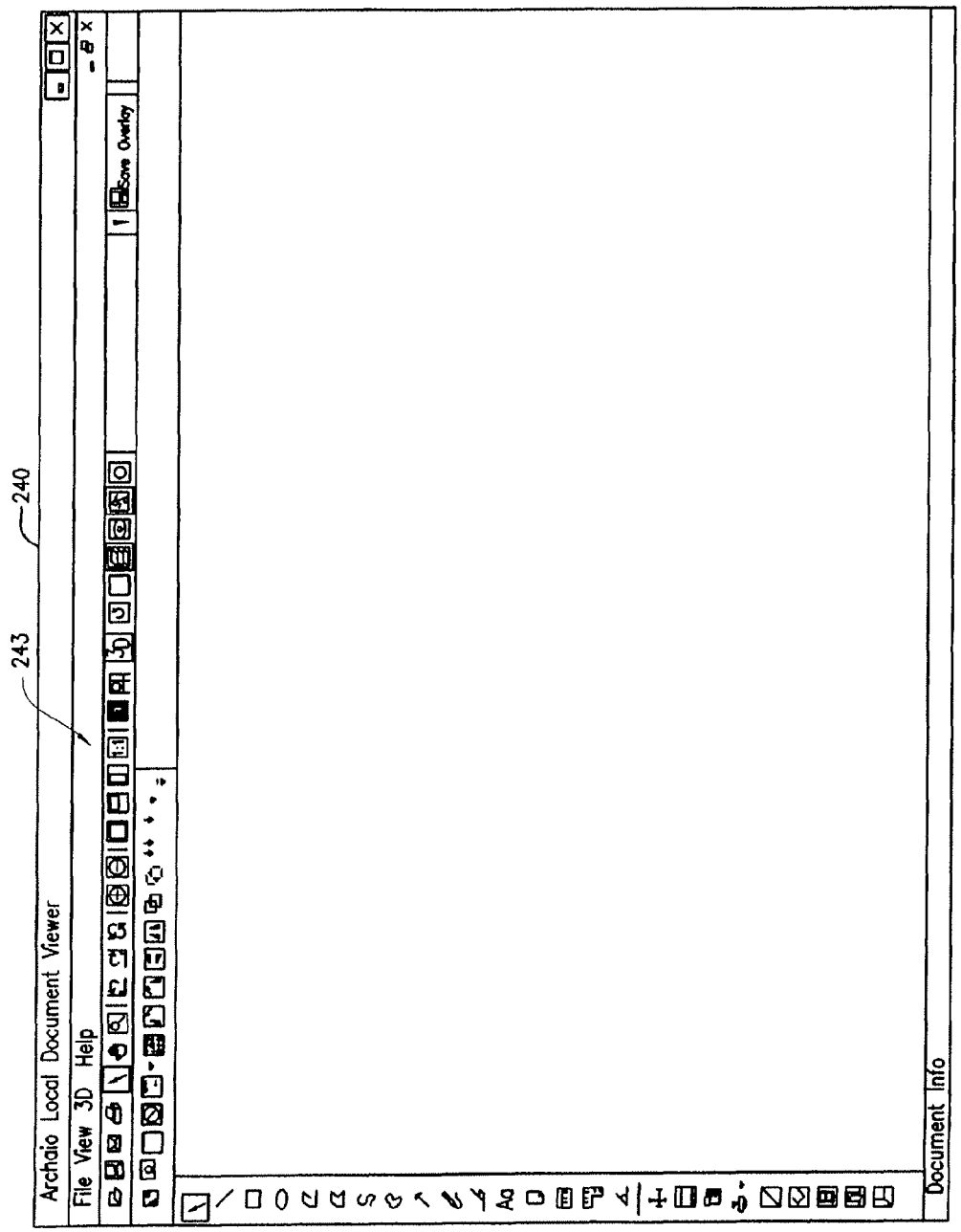

FIG. 17 is an illustrative user interface displaying the application shell of the 3D/2D display/viewer, as described in FIG. 13.

Figure 18A:
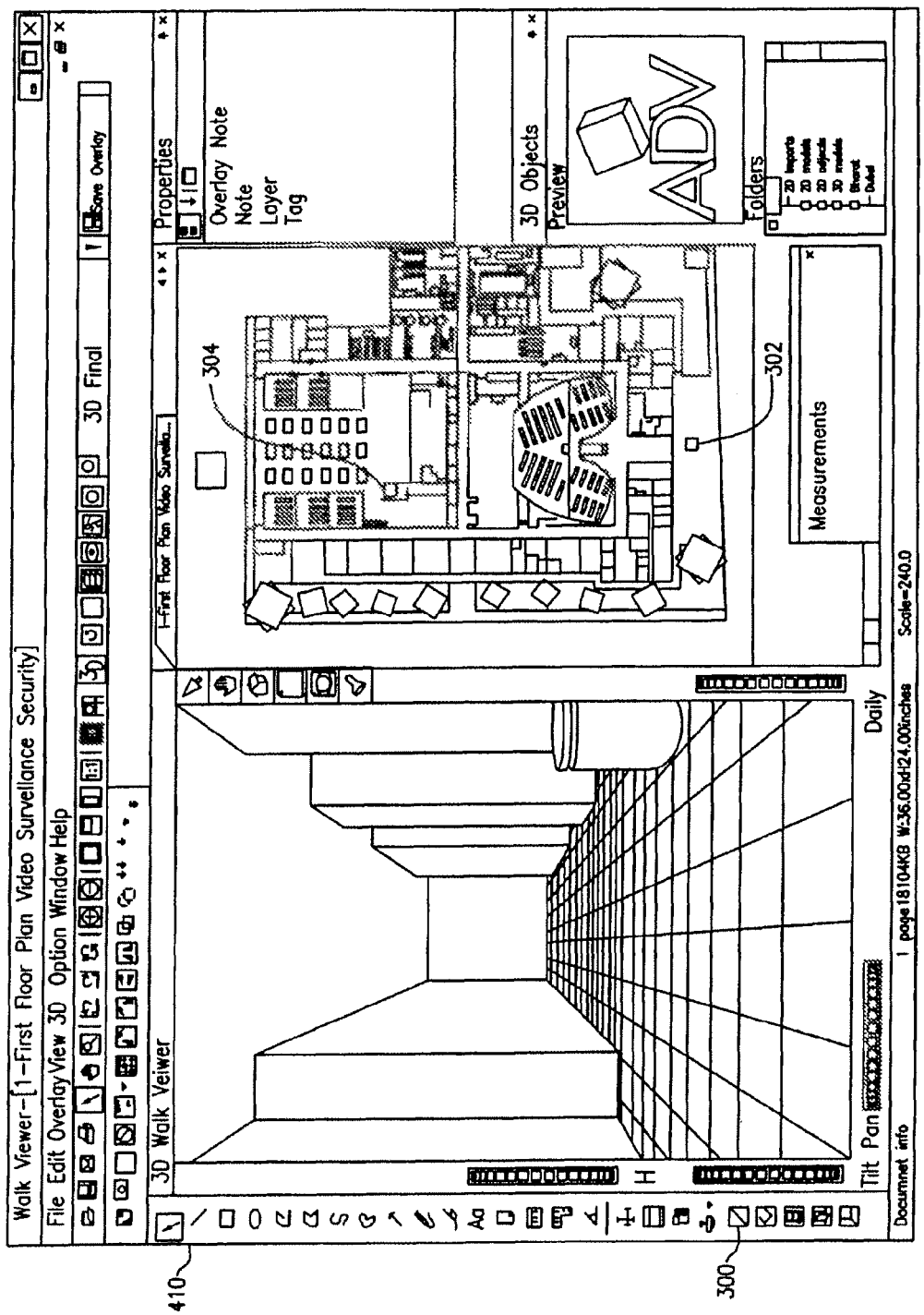

FIG. 18A shows a Find Path Tool employed on a single floor shown on a 3D/2D display/viewer.

Figure 18B:
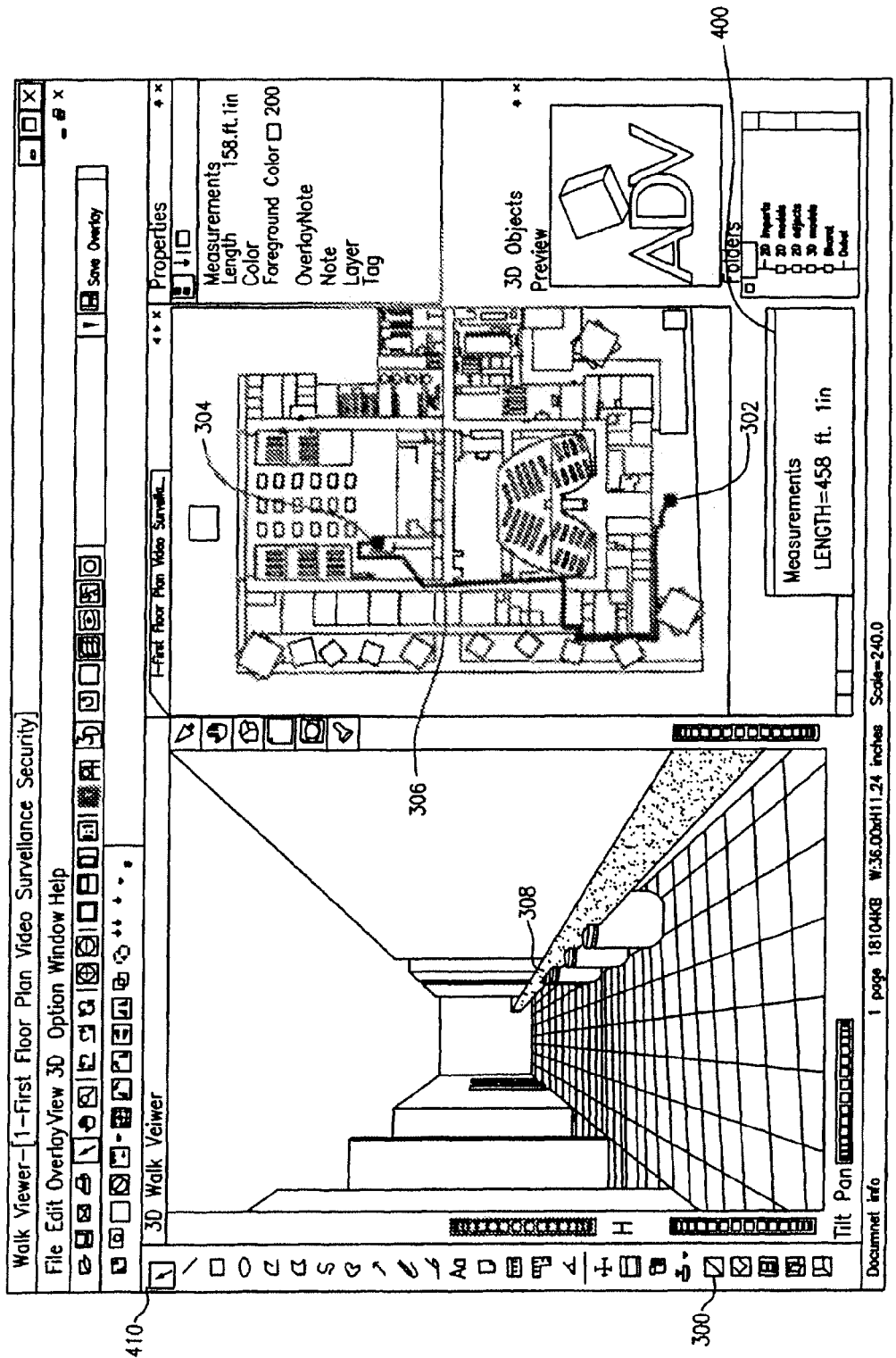

FIG. 18B shows a path calculated using the Find Path Tool of FIG. 18A.

Figure 18C:
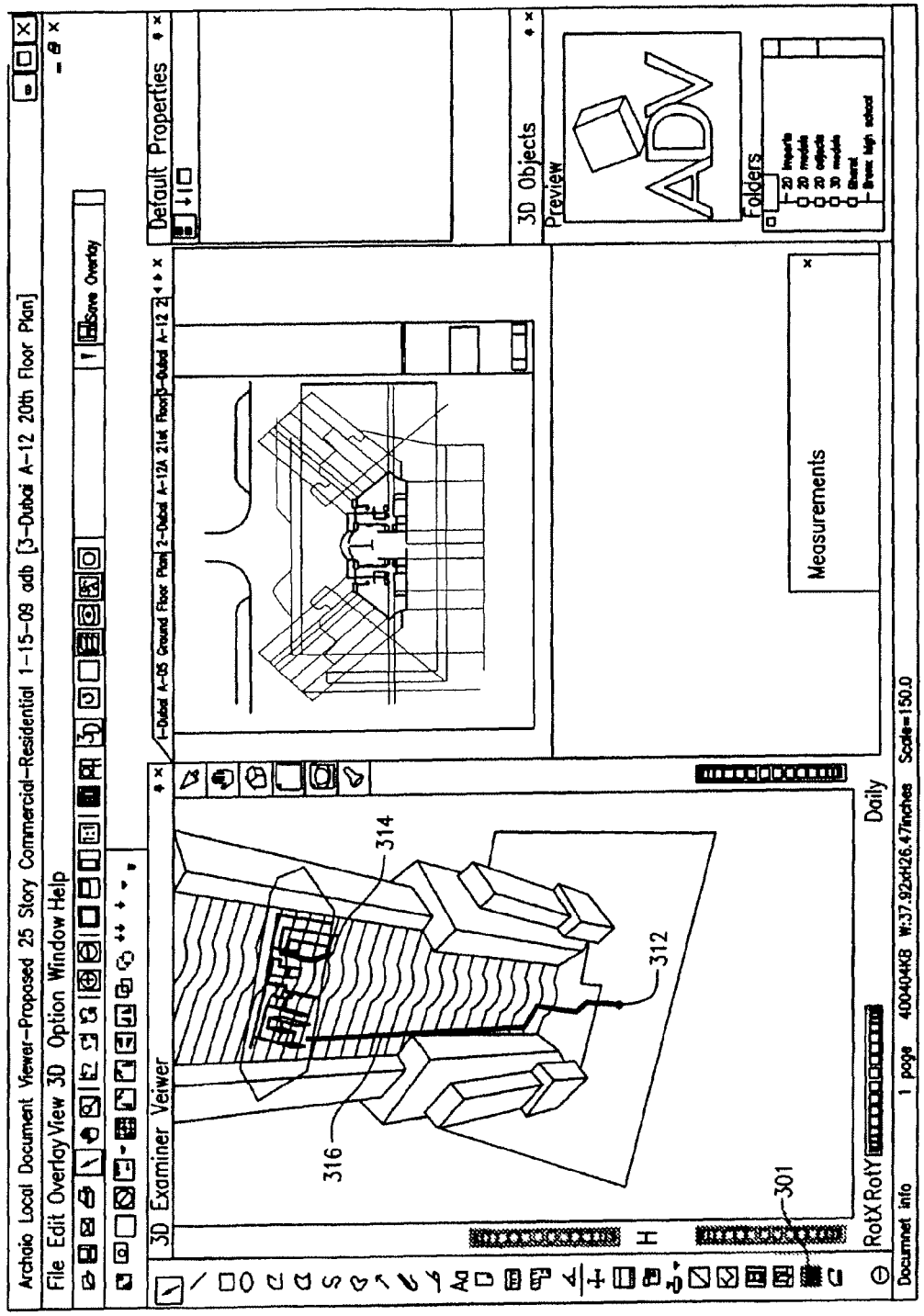

FIG. 18C shows a Find Path Tool employed on a multi-story building shown on a 3D/2D display/viewer.

Figure 19:
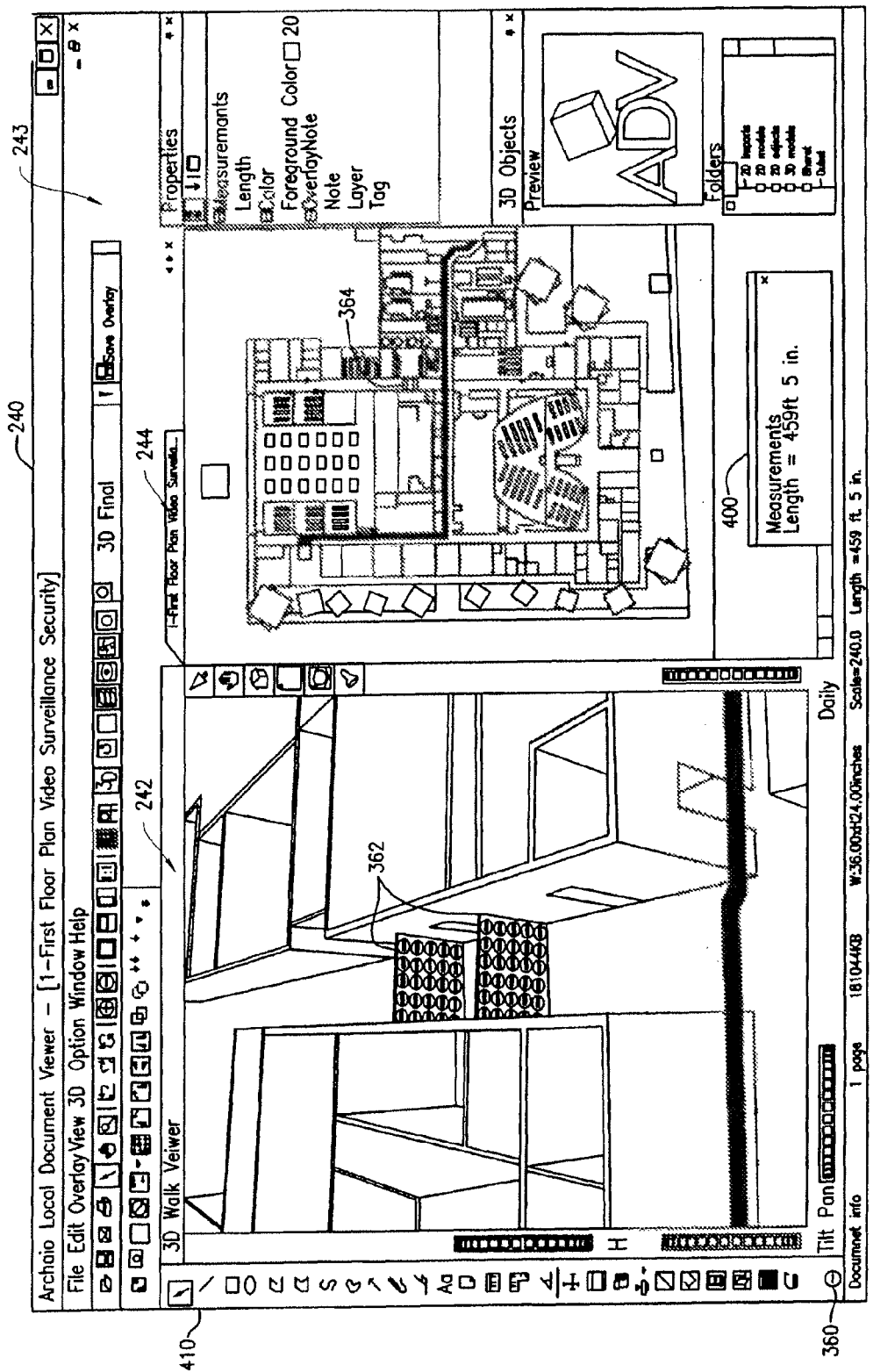

FIG. 19 shows a Barrier Path Tool employed with a 3D/2D display/viewer.

Figure 20:
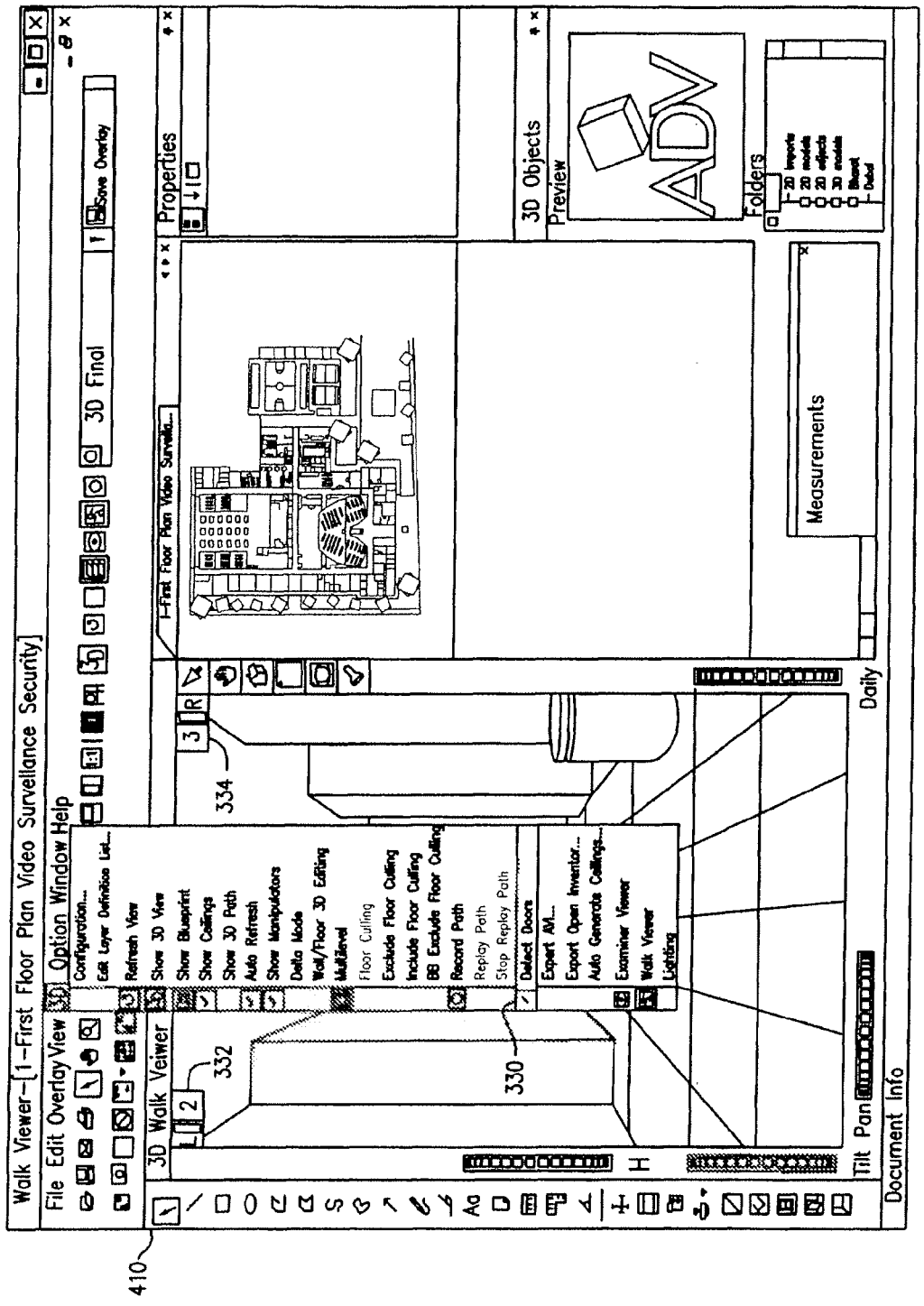

FIG. 20 shows a Door Detection Tool employed with a 3D/2D display/viewer.

Figure 21:
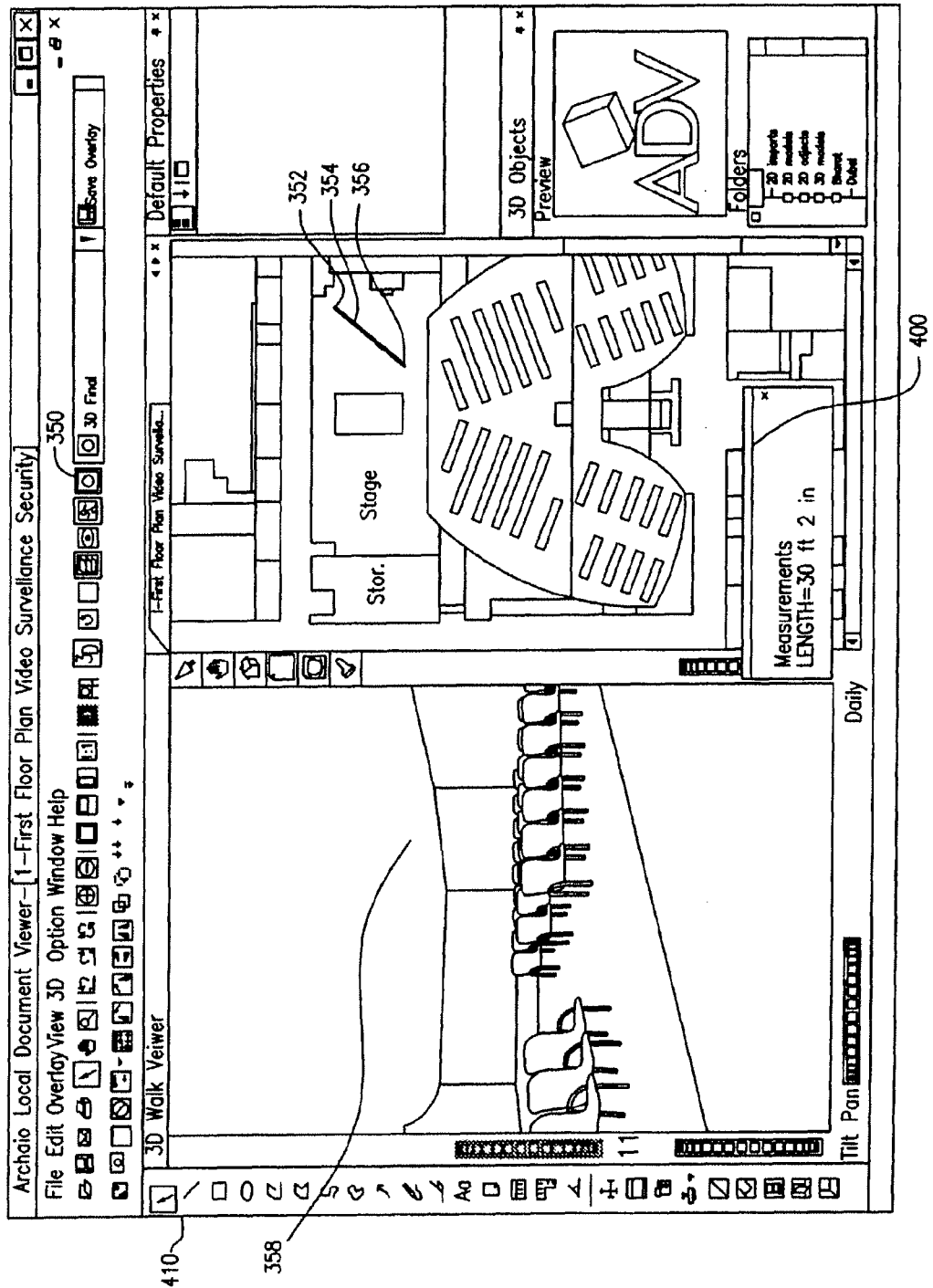

FIG. 21 shows a 3D Record Path Tool employed with a 3D/2D display/viewer.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

It will be appreciated that the systems and methods of the present invention are described below with reference to block diagrams and flowchart illustrations. It should be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the functions specified herein. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified herein. Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention provides a measurement tool for use with a viewer application for viewing a digitized drawing. The measurement tool enables the measurement of horizontal and vertical lengths, distances and areas (both regular shaped and irregular shaped areas) in true scale. While the present invention can be used with the digital representation of a paper document having a scaled drawing, such as an architectural drawings, engineering drawings or maps, it is described below in the context of architectural drawings for illustrative purposes. The disclosed embodiment should not be considered as limiting to the breadth of the invention.

The system also allows for an operator in a first location to provide information to a user at a second location. For example, once again using the example of the firefighters above, the firefighters can have a heads-up display, for example on a visor of the firefighter's protective gear, with the image of the building floor plan on his heads-up display. While supervisor on the street or at a central control location can then provide accurate structure navigation directions to the firemen via the heads up display, by oral instructions, or the like.

Another embodiment integrates all of a building's scaled plans into one system. Thus, structural, electrical, water, fire alarm, motion detection, and other critical systems are all easily accessible to emergency personnel. The emergency personnel will have an integrated view of disparate data to effectively identify and locate hazardous situations, potential victims, criminal perpetrators, or terrorist elements.

The system could use standard RF communication, optic links, Bluetooth, IR links, or the like. Further, the three dimensional model can be integrated with other building systems such as the intrusion alarm, fire alarm, smoke alarm, electronic building management or electronic building information management system so that various obstructions that may be present i.e., fire alarms, temperature caution monitors, hazardous materials locations, specialized building geometry and obstructions are taken into consideration when determining ingress and egress routes or other building centric decisions.

Further, emergency planning for other structures such as bridges and tunnels can be performed using the disclosed system. Additionally, GPS locators can be used to track personnel location. In another embodiment, RF triangulation is used to determine exact personnel location. RF triangulation is performed using antennas installed in a building or, for older buildings or buildings without such antennas, portable triangulation units are used.

In another embodiment, the triangulation equipment is in emergency response vehicles. RF triangulation can be used in conjunction with GPS locators so that the triangulation points are known using GPS technology and the exact location is determined by interpolation using triangulation.

The system uses existing electronic cad drawings or paper plans. The plans are processed and entered into the system and stored in one or more servers. The system, using a raster to vector conversion, prepares the paper or legacy plans for use. The prepared plans are drawn to scale. Once entered into the system, the plans are immediately accessible to all users, including remote users. In one embodiment, the plans are password protected.

The system can also be used for planning, decorating, and design. Once the plans are entered and scaled, other objects can be added to the plans such as furniture, rugs, and paintings. The system includes a walk-through and plan view feature so that the final layout can be viewed from a plurality of angles. Detailed measurements can be made using the disclosed system because the drawings are to scale.

In one embodiment of the system, kiosks are available in and around a structure that will allow users to select a start and end points. The system then generates a three-dimensional depiction and two-dimensional map display of the route perfectly to scale. The produced image will be to scale so that the user will easily be able to determine distances. Further kiosks would allow end users to view details about a buildings structure and get contextual true scale intelligence about the users current position in relation to the rest of the structure as the kiosks location would be known and could be pre-mapped or plotted using the system. Or using the systems drawing and annotation tools the kiosk user can display extended building data sets, for instance the location of exits and or building fire equipment such as fire extinguishers, all perfectly to scale and in context to the underlying true scale digital building floor plan.

With reference to FIG. 1, an embodiment of the present invention comprises a scanner station 12, a database 14, a workstation 16, a printer 18, a file input device 10, a transmitter 26, and a security system central office 8. The scanner station 12 includes a scanner and associated software required to capture a digital image of a paper document, such as a building blueprint, floor plan, riser diagram or other architectural or design drawing. In a preferred embodiment, the scanner station 12 comprises a high speed, large format scanner that is connected to a desktop computer of sufficient speed and RAM to process large digital images. In one embodiment, the scanner utilizes either ISIS or TWAIN interfaces, and that the compression/decompression algorithm utilized is TIFF CCITT Group 4, which is a lossless compression algorithm. It is important that the algorithm be lossless to preserve the pixel-to-pixel bitmap data captured by the scanner. The database server 14 comprises any suitable database for storing the image file created by the scanner and its associated software. In another embodiment, the image files are input into the database as digital files, e.g., cad files and the like. The database stores entire floor plans and structural details for a complete facility, making the data immediately accessible. Thus, emergency crews are fully aware of the entire building layout and any potential trouble spots well in advance of entering the structure.

The workstation 16 may be any suitable computing device with user interface means such as a monitor, keyboard, mouse, stylus, etc. The workstation may be a desktop computer or a portable computing device, such as laptop 28a, PDA 28b or cell phone 28c capable of displaying two and three dimensional images. The workstation includes a viewer 240. In the illustrated embodiment, the viewer 240 is a TIFF viewer capable of reading (i.e., decompressing) a TIFF image and displaying it to a user. The viewer 240 can be built, for example, utilizing the viewer components and tools provided by LEAD Technologies, Inc. Specifically, LEAD Technologies, Inc. provides a decompression tool, rubber band tool, display tool, overlay display tool, overlay storage tool and tag read tool that can be assembled into a TIFF viewer. A key aspect of the viewer 240 is the inclusion of a measurement calculator 22, in accordance with the present invention, for calculating the true scale measurement of lines and shapes drawing with the viewer 240.

The printer 18 is any suitable printer capable of printing from the workstation 16, and a network 24 interconnects the aforementioned devices. The network 24 may comprise any telecommunication and/or data network, whether public or private, such as a local area network, a wide area network, an intranet, an internet and/or any combination thereof and may be wired and/or wireless. Due to network connectivity, various methodologies as described herein may be practiced in the context of distributed computing environments.

In one embodiment of the invention, the workstation 16 has one or more docking stations associated with it. These docking stations are used to download the floor plans and structural details to a device such as a tablet PC 28a, PDA 28b, cell phone 28c, and the like. Thus, in addition to being able to having a printout of the data, an electronic copy can be used. In another embodiment, the data is transmitted to a PDA, cell phone, or the like utilizing transmitter 26. In one embodiment, data is transmitted to a heads-up display using Bluetooth technology, or the like.

In practice, the transmission of the data files to the cell phone, PDA or the like is done utilizing existing cell phone, wi-fi and pager infrastructure. In yet another embodiment, the data can be transmitted on standard FM signals s or any wired or wireless network capable of transmitting data packets.

With reference to FIG. 2, a method in accordance with the present invention is shown. As an initial step, a paper document is digitized, as indicated by block 58. This step includes scanning the paper document using the scanner station 12 to create a bitmapped raster image or using an input device to load a digital file. In the illustrated embodiment, the paper document is a drawing. The scale data and physical parameters of the paper drawing being scanned are captured and associated with the bitmapped image. Specifically, the original scale information of the paper drawing, the DPI of the scan, and the original size of the paper are recorded and embedded within the digital image. In another embodiment, the input is from file input device 10, which inputs a digital file.

An illustrative user interface for recording this information is provided in FIG. 3, which shows a Master File Info window 32 for entering the scale and physical parameter data of the paper drawing being scanned. Of particular interest, the X-DPI and Y-DPI fields 34,36 are where the direct optical scan characteristics of the scanner that are utilized for the scan are recorded. These values should be calibrated to ensure their accuracy. The SCN Width and SCN Height fields 38,40 are the actual pixel dimensions of the scanned image. The Scale field 42 is where the actual scale of the drawing is recorded as an integer. The value inputted may be calculated using the Scale Finder 44, which is provided at the selection of the Scale Finder button 46. The user merely enters the scale from the drawing in the correct units, and the Scale Finder will write the correct scale value into the Scale field 42. For example, if the scale was one inch equals three feet, the Scale Finder would write 36 into the Scale Field 42. Similarly, if the scale were one centimeter equals one meter, the Scale Finder would write 100 in the Scale field 42.

It should be noted that the information recorded and associated with the digital image file does not necessarily have to be recorded at the time the image is scanned or otherwise acquired. Also, additional information identifying the paper document may also be recorded, such as the building name, building owner, date of drawing, exact geospatial location, i.e. latitude and longitude, etc., as shown in the user interface 50 of FIG. 4.

In the illustrated embodiment, the paper drawing is optically scanned and saved as a TIFF file, and the captured data is stored in the TIFF header using TIFF header tags. TIFF Tag 50271 is a suitable location for storing the scale and physical parameter data. A suitable data structure for such information may be:

Tag 50271=DBSWWWWHHHHAABBSSSSSSSDB
DBS=Digital Building Plan Tag (letters "DBP")
W=Width (Original image scan width in pixels)
H=Height (Original image scan height in pixels)
A=HDPI (Horizontal DPI of scan)
B=VDPI (Vertical DPI of scan)
S=Scale (Inches to Inches document Scale, i.e., 1"=36")
DB=Digital Building Identifier Tag ("DB")

The Adobe tag 50271 is stored as ASCII data type with a variable length of 24 characters beginning with either "DBS" and ending with the Digital Building Identification Tag "DB". The width W is the scan width of the image in pixels. The height H is the height of the image in pixels. The A and B are the horizontal and vertical direct optical DPI of the scanner, respectively. This is the direct optical resolution of the scanner. The scale S is the scale taken from the paper drawing. Alpha-numeric ASCII characters with ASCII values between #48 and #90 may be used in data fields to avoid data and compression conflicts. In the illustrated embodiment, the values are converted to a base 34 number Referring back to FIG. 2, once the digital image file has been created, it may be stored, as indicated by block 60, preferably within a RAID server or SAN with its accompanying entry in the database sever 14. However, the digital image file may be stored in the memory of virtually any computing device, including at the scanning station 12, workstation 16, or a cell phone 28c, PDA 28b, or the like. In a preferred embodiment, the plurality of digital image files are stored together at a central data repository The digital image may then be viewed by a user, as indicated by block 62, preferably at a workstation 16. The digital image file is sent to the workstation via the network 24. The digital image display/viewer 240, can be utilized to open and view the digital image. The digital viewer application should at a minimum, have some drawing tools, with at least the ability to draw lines and to interconnect those lines to form a shape.

The user then utilizes the display/viewer to draw a line or shape (e.g., a regular shape or irregular shape, such as a polygon or an inverse polygon) or to map ingress and egress routes or calculate distances as indicated by block 64. The true scale measurement of a line or the length of distance of a route is calculated and presented to the user as indicated by block 66. For example, as illustrated in FIG. 5, the user has drawn a line 70, such as by the clicking and dragging the mouse or dragging a stylus. The true scale measurement of that line is calculated and presented to the user in the tool bar field 72, as indicated by block 66. Another example is provided in FIG. 6, wherein the user has drawn a polygon 74 and the true scale area of the polygon is presented to the user in the tool bar filed 76. Thus, in accordance with the present invention, the digital image viewer 240 is modified to access the scale and physical parameter information embedded within the digital image and calculates the true scale measurement of a line or area of a shape.

In the illustrated embodiment, the digital image viewer 240 reads the TIFF header tag 50271 to retrieve the scale and physical parameter data. The digital image viewer 240 then provided the measurement calculator 22 with the pixel data defining the user's drawing (e.g., a line or shape) and the scale information read from the digital image header tag. The measurement calculator 22 then calculates the true scale measurement using that information and the pixel location data of the line or shape. The calculated measurement can be presented to the user in any suitable format or location on the screen, though in the illustrated embodiment, the measurement is presented in a tool bar at the bottom of the window.

For illustrative purposes, several calculations are provided for lengths and areas of annotations drawn by the user using the drawing tools of the digital image viewer 240, and in particular, using a mouse input device.

The length of a line 80 is calculated with general reference to FIG. 7. The user initially triggers the calculations with a mouse-down event (while the line annotation is selected from the drawing tool bar). This event provides the first point of reference $(X_1,Y_1)$ in pixels, as illustrated in FIG. 7. When the user releases the mouse button this triggers a mouse-up event. This event provides the second (and final) point of reference $(X_2,Y_2)$ in pixels. With these two points $((X_1,Y_1)$ and $(X_2,Y_2))$ measurement calculator 22 can calculate the length between them (in pixels) using the Pythagorean Theorem, as provided by Equation (1) below:

$$\text{Length (in pixels)}=((x_2-x_1)^2+(y_2-y_1)^2)^{(1/2)} \quad (1)$$

This length is then divided by the resolution of the image to produce the representative length in inches on the original plan, or drawing, as provided by Equation (2) below:

$$\text{Length (in inches)}=(\text{length (in pixels)})/(\text{image resolution (dpi)}) \quad (2)$$

This length (in inches) is then multiplied by the blueprint scale (embedded into the header of the TIFF image) to produce the actual length (in inches) of the line, as provided by Equation (3) below:

$$\text{Actual length}=\text{plan length (in inches)}\times\text{plan scale} \quad (3)$$

The measurement calculator 22 then provides this true scale measurement to the viewer 240 for display to the user. If desired, further measurement conversions can be performed to calculate any unit of measurement desired. For example, measurement units can be converted from inches to feet or meters by simple multiplication of the unit conversion factor.

Next, the area of a rectangle 82 will be calculated with reference to FIG. 8. Initially, the user triggers the calculations with a mouse-down event (while the rectangle annotation is selected from the drawing tool bar). This event provides the first point of reference $(X_1, Y_1)$ in pixels. When the user releases the mouse button this triggers a mouse-up event. This event provides the second (and final) point of reference $(X_2, Y_2)$ in pixels. With these two points $((X_1, Y_1)$ and $(X_2, Y_2))$, the measurement calculator 22 can calculate the area between them (in pixels) using the Pythagorean Theorem, Equation (4) provided below:

$$\text{Area (in pixels)} = (x_2 - x_1)^2 + (y_2 - y_1)^2 \qquad (4)$$

This area is then divided by the squared of the resolution of the image to produce the representative area in inches on the original plan, or drawing, as provided by Equation (5) below:

$$\text{Area (in inches)} = (\text{Area (in pixels)})/(\text{image resolution (dpi)})^2 \qquad (5)$$

This area (in inches) is then squared and multiplied by the square-root of the blueprint scale (embedded into the header of the TIFF image) to produce the actual area (in inches) of the selected rectangle, as provided by Equation (6) below:

$$\text{Actual area} = (\text{plan area (in inches)})^2 \, (\text{plan scale})^{(1/2)} \qquad (6)$$

The measurement calculator 22 then provides this true scale measurement to the viewer 240 for display to the user. If desired, further measurement conversions can be performed to calculate any unit of measurement desired. For example, measurement units can be converted from inches to feet or meters by simple multiplication of the unit conversion factor.

The area of an ellipse 84 is illustrated next with general reference to FIG. 9. The user initially triggers the calculation with a mouse-down event (while the ellipse annotation is selected from the drawing tool bar). This event provides the first point of reference $(X_1, Y_1)$ in pixels. Then the user releases the mouse button this triggers a mouse-up event. This event provides the second (and final) point of reference $(X_2, Y_2)$ in pixels. With these two points $((X_1, Y_1)$ and $(X_2, Y_2))$, the measurement calculator 22 can calculate the area between them (in pixels) using the Pythagorean Theorem, Equation (7) provided below:

$$\text{Area (in pixels)} = \Pi[((x_2 - x_1)/2) + ((y_2 - y_1)/2)] \qquad (7)$$

This area is then divided by the squared of the resolution of the image to produce the representative area in inches on the original plan, or drawing, as provided by Equation (8) below:

$$\text{Area (in inches)} = (\text{Area (in pixels)})/(\text{image resolution (dpi)})^2 \qquad (8)$$

This area (in inches) is then squared and multiplied by the square-root of the blueprint scale (embedded into the header of the TIFF image) to produce the actual area (in inches) of the selected ellipse, as provided by Equation (9) below:

$$\text{Actual area} = (\text{plan area (in inches)})^2 \, (\text{plan scale})^{(1/2)} \qquad (9)$$

The measurement calculator 22 then provides this true scale measurement to the viewer 240 for display to the user. If desired, further measurement conversions can be performed to calculate any unit of measurement desired. For example, measurement units can be converted from inches to feet or meters by simple multiplication of the unit conversion factor.

The length of a poly-line 86 is calculated next with general reference to FIG. 10. The user initially triggers this calculation with a mouse-down event (while the poly-line annotation is selected from the drawing tool bar). This event provides the first point of reference $(X_1, Y_1)$ in pixels. The user then moves the mouse and clicks (the left-button) to add additional nodes $[(X_2, Y_2). (X_3, Y_3), \ldots (X_{n+1}, Y_{n+1})]$. Once the user is completed with the poly-line they can either double-click the left mouse button or single click the right mouse button to end the poly-line and trigger the calculation of the length. This provides, for use in the calculation of the length, (n+1) nodes and (n) line segments; where 'n' is some arbitrary absolute number. With this collection of points the measurement calculator 22 can cycle through each node and calculate the summation of the lengths of each line segment using the Pythagorean Theorem (on each segment respectively), as provided below by Equation (10):

$$\text{Length (in pixels)} = \sum_{i=1}^{n} ((x_{i+1} - x_i)^2 + (y_{i+1} - y_i)^2)^{(1/2)} \qquad (10)$$

This length is then divided by the resolution of the image to produce the representative length in inches on the original plan, or drawing, as provided by Equation (11) below:

$$\text{Length (in inches)} = (\text{length (in pixels)})/(\text{image resolution (dpi)}) \qquad (11)$$

This length (in inches) is then multiplied by the blueprint scale (embedded into the header of the TIFF image) to produce the actual length (in inches) of the poly-line, as provided by Equation (12) below:

$$\text{Actual length} = \text{plan length (in inches)} \times \text{plan scale} \qquad (12)$$

The measurement calculator 22 then provides this true scale measurement to the viewer 240 for display to the user. If desired, further measurement conversions can be performed to calculate any unit of measurement desired. For example, measurement units can be converted from inches to feet or meters by simple multiplication of the unit conversion factor.

The area of a polygon 88 is next illustrated with reference to FIG. 11. The user initially triggers these calculations with a mouse-down event (while the polygon annotation is selected from the drawing tool bar). This event gives us the first point of reference $(X_1, Y_1)$ in pixels. The end user then moves the mouse and clicks (e.g., the left-button) to add additional nodes $[(X_2, Y_2). (X_3, Y_3), \ldots (X_{n+1}, Y_{n+1})]$. Once the user is completed with the polygon they can either double-click the left mouse button or single click the right mouse button to end the polygon and trigger the calculation of the length. This provides, for use in the calculation of the length, with (n+1) nodes and (n) line segments; 'n' is arbitrary and absolute. With this collection of points one can iterate through the line segments and get a running total for the area. This area is calculated by first identifying a baseline below the polygon, then identifying a trapezoid whose sides consist of (1) a single line segment on the polygon, (2) a line from the rightmost point in the polygon segment to the baseline which is perpendicular to the baseline, (3) a segment of the baseline, and (4) a line from the baseline to the leftmost point in the line segment (drawn perpendicular to the baseline). The area of the trapezoid is calculated with Equation (13) below:

$$\text{Area (in pixels)} = (1/2) \sum_{i=1}^{n} (x_i y_{i+1} - x_{i+1} y_i) \qquad (13)$$

This area is then divided by the squared of the resolution of the image to produce the representative area in inches on the original plan, or drawing, as provided by Equation (14) below:

$$\text{Area (in inches)} = (\text{Area (in pixels)})/(\text{image resolution (dpi)})^2 \quad (14)$$

This area (in inches) is then squared and multiplied by the square-root of the blueprint scale (embedded into the header of the TIFF image) to produce the actual area (in inches) of the selected rectangle, as provided by Equation (15) below:

$$\text{Actual area} = (\text{plan area (in inches)})^2 (\text{plan scale})^{(1/2)} \quad (15)$$

The measurement calculator 22 then provides this true scale measurement to the viewer 240 for display to the user. If desired, further measurement conversions can be performed to calculate any unit of measurement desired. For example, measurement units can be converted from inches to feet or meters by simple multiplication of the unit conversion factor.

The present invention permits the user to view the file in an emergency situation. For example, if firefighters are dispatched to a burning structure, the firefighters download the digital files to a PDA or the like so that they have the entire structural layout of the building. In one embodiment, a first user at a workstation provides routing or other information to a second user in a structure. The second user receives this information on a PDA, cell phone, tablet computer, heads-up display, or the like.

In one embodiment, the user views the drawing on a viewer 240 such as a computer, laptop 28a, PDA 28b, or the like. The blueprint presented on the PDA provides the user (emergency response personnel) with accurate measurements of floor space and distances between entrances, exits and target locations. Additionally, the system provides full scaling functionality. This scaling functionality allows a user to zoom in and out of a specific area to provide as much or as little detail as required. In one embodiment, to zoom a user uses a zoom tool to select the area that should be zoomed. Alternately, the system will zoom in preset increments, i.e., 10%, 20%, 30% around a specific area merely by tapping a stylus in the desired zoom area. It should be noted that no matter how much a user magnifies the display, it remains accurately scaled.

Along with measurements, the system can display, visualize and calculate details about other structural elements such as stairwells, elevators, entrances, exits, shaft ways, building management systems, cooling units, emergency power; emergency command posts, areas of refuge and the like. Further, the location of sprinklers, fire extinguishers, hose hook-ups, risers, HVAC systems and electrical access panels can also be provided on the layout. In yet another embodiment, hazardous materials can also be displayed.

In one embodiment of the invention, a building security system is tied into the network. The security system can provide such data as active alarms such as fire alarms, smoke alarms, carbon monoxide alarms, smoke alarms, and the like. In this manner, emergency workers can determine problem areas and potential rescue situations. Additionally, a building's motion sensors can be tied into the network such that people in the building can be tracked, thereby enabling enhanced rescue attempts. For instance, GPS locators can be used to track people and equipment. Alternatively, if a hostage situation exists, police can use this data to plan a terrorist mitigation or asset recovery mission.

FIG. 12 is an illustration of a data display, in accordance with an embodiment of the present invention. As shown, the display is zoomed in to so the user can discern a desired level of detail. In a preferred embodiment, a cursor is used to select a start point such as entryway 116 and end point 110. The system programmatically calculates a route from 116 to 110. Two routes are shown in FIG. 12. A first route, 102, is shown from the entryway 116 to a point 110 in a back office. A second route 104 is shown from the entry point 116 to a utility closet housing a PBX and Hub. In one embodiment, items such as outlets 114, switches 118, and telephone jacks are shown. Other items such as electrical conduits, HVAC systems, and plumbing are shown. The display provides data from motion sensors 100, heat and smoke alarms, and door and window sensors, which are tied to the display.

In one embodiment, a kiosk 120 is present. Building visitors use the kiosk 120 as a guide. In one embodiment, patrons use the kiosk as a directory. Patrons either selects a destination graphically, e.g., a desired office 110, or selects from a directory listing. Either way, the route, and if desired route adjacent areas of interest such as a building locations or hazard, are displayed.

Users use zoom tool 108 a user zooms in and out of a specific area to provide as much or as little detail as required. In one embodiment, to zoom, zoom tool 108 selects the specific area to be magnified. Alternately, the system will magnify in preset increments, i.e., 5%, 10%, 15%, etc. using the selected area as the center of the area to be magnified. In another embodiment, the preset increments are selectable by the user. It should be noted that accurate scaling of the image and accurate scaling of all measurements are maintained at each magnification point.

As described above, the system and method according to the present invention provides the ability to take paper based original drawings and provide scaled digitized images that allow for accurate point to point measurement and routing. The foregoing embodiments are given by way of example for the purpose of teaching the method and system of the present invention. The present invention is not limited to these embodiments and one skilled in the art may affect various changes and modification within the spirit of the invention as defined in the appended claims.

Also as mentioned above, the present invention can be used by anyone including and not limited to firemen, emergency response, command and control, police, EMT, utility workers, military, and building operations, management tenants and ownership as well as facility engineers. In one embodiment the invention can be implemented for a city emergency operations center with access being granted to local, federal and state fire, police and emergency services users.

Another method in accordance with the present invention is shown now in FIG. 13. At block 200 a document is scanned or otherwise digitized and the original document image scale information, DPI of the scan and original paper size is captured and embedded into the digital file header of a two dimensional digital raster image. The scanned document may include floor plans from a single building, or more likely a collection of buildings.

A true scaled three dimensional virtual digital model rendering (also called the 3D digital image or 3D digital rendering) is created based on the two dimensional digital raster image. Specifically, the viewer and the associated tool sets are used manually, or through programmatic steps, to annotate the 2D digital raster image so that the properties and positions of the 2D annotations are programmatically translated to create a scene graph which is then used to create the associated-3D digital image. See block 205. The scene graph lists the objects, properties, and transforms that describe the 3D digital image. The scene graph is organized by loose groups of similar object types rather than any specific order of objects.

Once the 2D digital raster image file and the 3D virtual model files have been created, each file may be organized and stored as individual yet associated files using a file system in the database sever 14, the memory of any computing device or a central data repository. See block 210. Individual documents are stored in a file server and associated to database records. Documents may preferably be organized in the database by building and floor or some universal standard.

The user may search the database for the digital image file to be viewed at a workstation 16 using a computer or laptop 28*a* or the like. See block 220. Users of the database can locate and view individual digital plans or groups of digital plans. The database can be located on a closed network, a web accessible network or a localized computing device with no network connectivity.

The user can query the database to locate a specific digital image or group of digital images (block 230) such as an entire 3D building, a digitized floor plan document or the individual floor 3D scene. The selected digital image file is then distributed to the workstation via the network 24 and viewed, to-scale on a dual 3D/2D digital image display/viewer 240. The digital viewer 240 may include but is not limited to synchronized graphic rendering devices, synchronized user interactive graphic displays, linked graphic representations, real time event linked display mechanisms, synchronized horizontal display surfaces, synchronized holographic displays, synchronized graphic screens, dual monitor heads up displays, auto stereoscopic displays and immersive graphic environment. In one embodiment, the digital image file is pre-populated onto mobile computer systems with 3D enabled video graphic hardware and software.

The digital image display/viewer 240 can open and render the digital image files and retrieve the original image/document scale information that is embedded in the 2D digital image header. The digital image display/viewer 240 has a multiple document interface having display means, windows or view ports that are linked and coordinated and can be seen simultaneously.

An illustrative user interface of the display/viewer 240 is shown in FIG. 14 comprising an application shell 243, two document view ports (a 3D window 242 being 3D graphics enabled and a 2D window 244 being 2D graphics enabled), a basic set of drawing tools and a menu interface to activate functionality and interact with the 3D and 2D displays. Both the 3D window 242 and 2D window 244 can be sized and positioned to the user's preference. In one instance, the 3D window 242 occupies 40% of the left hand side (LVP) of the display/viewer 240 and the 2D window 244 occupies 40% of the right hand side (RVP) of the screen.

Images displayed on the 3D display 242 are true scaled three dimensional digital renderings that are initially viewed as a ground plain view wherein the user perspective is parallel to the plain of the document surface. The view angle can be manually changed and rotated on the X, Y or Z axis permitting the user a view perspective at any desired angle or height. See FIG. 14. Images displayed on the 2D window 244 are viewed perpendicular to the surface of the document. For instance a scaled digital floor plan or an architectural drawing view in 2D will be viewed in plan view which is maintained when the document is zoomed or rotated or otherwise manipulated. The 2D digital raster image is the master file, real data, and is the origination point for data as scale data is embedded and read from the digital image rendered in this location for both the 3D and 2D windows.

The simultaneous viewer 240 serves as a tool that provides the user with an enhanced awareness of a situation or environment and an overall intelligence of the structure shown in the drawings. The user can manipulate the digital images using the simultaneous viewer 240 using tools employed with the viewer 240. For instance, the user can identify start and end points on an image displayed in a select window (block 250), use the shortest path tool to find the fastest route between two graphically marked/user chosen points with no restrictions or limitations on the end and start point locations in context to the building image (block 260), select an stairwell and set it to be an Evacuation stairwell which will then only allow that stairwell to be used for routes calculated from a building floor down through the structure and/or an attack stairwell which will then only allow that stairwell to be used for routes calculated from a building location up through the structure and force the Shortest Path tool to use that stairwell as a first node in the route calculation (block 265), calculate the shortest path between points and display the total distance using the shortest path algorithm and the embedded scale information (block 270), graphically display the shortest path diagrammed in the 3D window 242 (block 280) and 2D window 244 (block 285) and also view the true scale measurement of the shortest calculated path (block 290). Additionally the calculated path data, i.e. the graphic display data and the true-scale path measurement data can be selected in the 3D window and with a mouse command and an application dialog appears that allows the calculated path to be named and saved for future retrieval and use (block 295).

Creating the Two Dimensional Digital Raster Floor Plan Image

Referring back to block 220, the scanned document creates a true-scale 2D digital image, which is displayed in the 2D window 244. The captured scale data is embedded in the TIFF header of the 2D digital image. Each object represented in the 2D digital image of the 2D window 244 is represented by a 2D primitive, usually a line for a wall, or a rectangle for a door, window, or other object. The shapes represented by the digital image in the 2D window 244 may be either 2D only data (being data that does not have 3D-associated representations) or data with 3D-associated representations, also called 3D related objects. The 3D-related objects have additional information relating to type, orientation, off-ground position and object height that is not realistically presentable in the 2D window.

Creating the True Scaled Three Dimensional Virtual Digital Model Image

As mentioned above, the scale information embedded in the original raster 2D floor plan is also used to construct a true scaled three dimensional digital model image, specifically the scale information is translated into associated 3D virtual models via the scene graph. The 3D digital image/3D digital rendering displayed in the 3D window 242 is prepared using the 3D-related objects data graphically overlaid on the original 2D digital image displayed in 2D window 244. Each object in the 2D data set is evaluated to extract information contained in 3D related objects and any predefined model associated with the object is added tp the scene graph. (2D Data annotation objects representing walls do not have separate associated models. The 2D wall annotations are directly extruded into true scale 3D geometry elements.) Then the 3D objects are arranged using positional coordinate information, 3D object data structures are created, and pointers to the 3D structures are added to the associated 2D object data sets.

Using the 3D digital image, a user can use a computer mouse to manually navigate the 3D virtual model of the building and virtually walk through rooms and hallways of the model displayed on the 3D window 242. A 3D window camera is used with the 3D window 242 to assist in viewing the path taken in the 3D virtual model. The 3D window camera can be set in a location to define the view of the structure that is presented in the 3D window 242 and render the scene from the camera's point of view. The path taken in the 3D virtual model can be viewed as if the virtual moving camera is positioned on a person's head.

The display/viewer 240, the 3D window 242 and 2D window 244 are designed to work in cooperative form. For instance, the 3D window 242 and the 2D window 244 may be child applications of the application shell (a parent application) 243, or two separate applications may be tied to a third application, or all three applications are tied together. As a result, using the display/viewer 240 the user can not only simultaneously view the 2D digital image of a floor plan in the 2D window 244 and the associated 3D digital model image of the structures and objects of the floor plan 242 but also synchronize, in real-time an action taken in one window and display it in the other window. Furthermore, using the tools employed with the display/viewer 240 the user can manipulate or derive information from the digital images. As an option, the present invention allows the user to open one window, 242 (see FIG. 15) or 244 (see FIG. 16), and manipulate the digital image using only the open window alone. All changes or other input made in the open window is tracked and relayed to the closed window when it is opened again, for instance, by the parent application 243 (see FIG. 17) when the parent application is used to manage all changes made in the 3D window 242 and 2D window 244.

The 3D window 242 and 2D window 244 of the display/viewer 240 are true to scale, coordinate matched, and linked in real time providing an interaction between the images in each the 3D and 2D windows 242, 244. The mechanism by which the objects are kept accurately synchronized is accomplished by associating scale, selection events and coordinates from one window 242, 244 to the other window 244, 242, respectively.

Synchronization Using Scale

As described above, the scale information of the original image/document is embedded in the digital image header. This data is retrieved and used by the digital image viewer 240. As the 3D digital image is associated to and based on the 2D digital image, the true scale value is the same in the two windows 242, 244. In some embodiments the scale between the windows 242, 244 could be different. In such cases an algorithm may be used to translate the scale from one window to the other.

Synchronization Using Selection Events

Selection event synchronization takes advantage of the fact that each object movement or position change (user input) creates a software selection/transform event. These selection events provide the identity and updated position for the object. Depending on which window the user employs, the selection events or action taken by the user in one window is simultaneously repeated (causes a re-draw) in the other window. Generally, when an object is moved, the selected object is flagged, a 2D selection event list is cataloging each flagged/selected object (logged selection event) and an update is affected using the 2D selection event list in the corresponding window. Variations are present in this process depending on which window is used to create the selection event.

Changes Made to Objects in the 2D Window

When a user makes a change to one or several objects in the 2D window 244, a flag is set by the selected object and the flagged object is put in a 2D selection event list. An Idle State Processing Program, is part of the parent application, is then employed to update the 3D digital image. For instance when deleting an object from the 2D window the Idle State Processing Program will cycle through the 2D selection event list checking the flagged objects and deleting the corresponding 3D representation of the flagged 2D object in the scene graph. The 3D data is deleted during an update of the 3D digital model image as it is translated from the real 2D data.

The 2D selection event list containing the updated information is then iterated through and new 3D objects are generated and placed into the scene graph. Accordingly, to effect a change to an object's 3D representation, it must be located in the scene graph, its data updated, and the scene graph re-rendered. The replacement of the objects straightforward and efficient given that the scene graph is organized as loose groups of similar object types. The scene graph can be manipulated so that updates do not cause the entire scene to re-render only the affected objects for which a selection event is recorded.

To prevent thrashing (causing too many re-renders per object move) the Idle State Processing Program is only initiated when an idle state in the application is detected by the system, such as when there is no selection event, change or input from the user. Here, when the Idle State Processing Program is opened, changes are made to the scene graph to update the 3D digital image. Unnecessary changes are further controlled by keeping track of which objects have been selected. Both the 3D and 2D data sets contain lists of the currently selected objects, and it is only the objects in these smaller lists that will be changed. Accordingly, once the 3D digital image has been updated, flags are set to prevent the 3D-side-change selection events from triggering changes on the 2D side.

Changes Made to Objects in the 3D Window

When a user moves or rotates an object in the 3D window 242 a selection event is triggered, a flag is placed by the 3D selected object in the scene graph and a 3D selection event list is created. The selection event occurring in the 3D window 242 possesses the identity of the object and transform information for the action taken. The transform is the new X, Y and Z positional and rotational angle information that has been applied to the 3D object. The transforms are applied to only the selected 2D object(s) in the 3D selection event list. Unlike the changes initiated in the 2D window 244, here, the selected 2D object data is not deleted but rather is directly modified because 2D data is treated as the real or source data.

The selected 2D data is updated using known scaling factors and position and orientation information needed to correctly show on the 2D digital image or representation in the 2D window 244. Additional information such as z-axis rotation or vertical position information cannot be shown in the 2D window, but is saved in the object's data set.

Here too, changes are made in the background of the 2D digital image to effect an update after the Idle State Processing Program detects no activity and flags are set that prevent the already updated 2D digital image components new positions from triggering further 3D selection events.

Synchronization Using Coordinates

The coordinate matched feature of the dual three-dimensional/two-dimensional visual display/viewer 240 is based on a non-rendered mathematically accurate grid system. Each of the 3D and 2D digital images has a non-rendered grid positioned on top thereon reflecting the precise pixel dimensions of the document. The coordinate system of each window in the display/viewer 240 is linked to a common referenced point or cross referenced point usually being the upper-left corner of the floor plan as the 0, 0 point.

Thus, a 2000 W×1500 H pixel document has a corresponding 2000×1500 space grid on top of it. This grid is a computed virtual entity that is not drawn or seen and can extend infinitely on any axis. When viewing the entirety of the document at 0% zoom, the upper left hand corner of the document is the 0 Y (Vertical Axis), 0 X (Horizontal Axis) and, when applicable, 0 Z (Three-Dimensional axis).

The linking of coordinate positions for data objects displayed in each the 2D window 244 and 3D window 242 of the display/viewer 240 is dependent on the non-rendered grid. A two-way relationship is created by the linking of the coordinate systems. Thus when an object is moved or annotations are made, manually or programmatically, in the 3D window 242, the corresponding 2D graphic representation in the 2D window 244 will move near simultaneously and vice versa.

The coordinate system inherent in the display/viewer 240 enables linking by allowing a discreet set of pixels to be colored graphically to mark a chosen shape, line or point. Indeed a point marker could be as small as 1 pixel W 1 pixel H. Because pixels have a definitive size that cannot be divided graphic representations of lines and shapes are always estimations.

The coordinate system allows relative positions to be defined and corresponded to other relative or arbitrary positions. The coordinate system of the present invention may even correspond to real world locations defined by coordinates of outside systems such as geographic coordinate system including latitude and longitude, e.g. a GIS systems. The display/viewer 240 can receive coordinate input from a third or outside coordinate system as long as the external coordinate grid and scales can be converted to the coordinate system shared by the windows 242, 244. Such conversion occurs by translating the disparate coordinate system scales and defining at least one common reference point. Preferably multiple common reference points would be established.

By using outside coordinate systems, the present invention allows users to receive coordinate data describing the location of an asset or object based on the Geographic Coordinate system and translate those coordinates to an exact spot on the 3D and 2D windows 242, 244 representations of a structure.

In practice, a point defined graphically in the 2D window 244 can be calculated to have a certain coordinate position because of the grid and a relative true scale measured size resulting from scale data that is embedded in the digital image header.

The present invention combines contextual and structurally connected visual information to allow the user to obtain an enhanced situational awareness of a structure and to intelligently navigate through the structure. For instance, users can simultaneously see their immediate true scale spatial environment in the 3D window 242, (along with what the room looks like) and their accurate, true scale orientation (with respect to the end point/goal) and current position in the building as shown in the 2D image displayed on the 2D window 244.

The coordinate-linked, dual and simultaneous nature of the 3D/2D display/viewer 240 when combined with the tools of the viewer 240 allow the user to interact with the digital images in each window 242, 244 and thus better understand an environment. The user can manually trace out a route, experience (virtually walkthrough) the route, describe the route's environment during the virtual walkthrough, see a real time position indicator for the assets location in the 2D view port, and obtain the true scale measurement between objects and locations or of the navigated path displayed and saved.

Also, once the 3D visual navigation of the structure can be recorded, it can be made distributable using standard video files outputs.

Tools

The tools employed with the display/viewer 240 include but are not limited to a basic scale measurement calculator 22, a basic graphic drawing tool set capable of making precise colored annotations on the digital image, a Find Shortest Path Tool 300, a Path Barrier Tool 360, a Door Detection Tool 330 and an Evacuation Simulation Tool. These tools may be managed by the parent application 243 and can be used in either window 242, 244.

Drawing Tools

As described above, the drawing tools 410 permit a user to construct lines, shapes and points with vector or raster graphic drawings. These drawings are then presented on a layer on top of the original drawing, digital document. Using the display/viewer 240 of the present invention, the user can trace out a path on the 2D window 244 using the basic drawing tools and have the same path rendered precisely and programmatically in the 3D window 242. The path shown in the 3D window is contextually correct being true to scale and reflecting the accurate measurements of a structure. A route virtually walked in the 3D window 242 can be visually recorded as a user generated animation, saved and played back, as discussed below.

Find Shortest Path Tool

Referring to FIG. 18A, the Find Shortest Path Tool 300 uses an algorithm to automatically calculate and allow the visual plotting of the shortest path between points selected in either the 3D or 2D windows. This Find Shortest Path Tool works by transforming the map matrix and distance/area data present in the digital document floor plan image and automatically calculates the shortest path. The shortest calculated path and the associated path true scale measurements are known and able to be calculated as a result of the scale that is embedded into the header of the TIFF image.

In practice, a user selects the Find Shortest Path tool 300 then graphically marks start and end points on one digital image in a selected window. For example, an emergency personnel can mark the start point 302 as being a doorway in a building and mark the end point 304 as being a computer classroom in which a victim or hostage is said to be located and using the Find Shortest Path tool 300 calculate the shortest path 306 between the two points. See FIGS. 18A and 18B. The tool 300 can be used on a single floor, as shown in FIGS. 18A and 18B, or across multiple floors, see Find Shortest Path tool 301 as shown in FIG. 18C. When the tool 301 is used across multiple floors, it will identify and traverse the building's unique set of emergency stairwells; entrances and exits during route calculations. See FIG. 18C showing start point 312, end point 314 and route 316.

This tool 300, 301 can assist emergency response or other personnel in navigating from the doorway to the stairwell even when the floor of a building is visually or physically obstructed. This Find Shortest Path tool may also be used by emergency response personnel to determine the fastest route to an emergency location inside a building even before arriving on scene or when having no prior knowledge of the building's interior structure, saving precious time.

In a preferred embodiment, the shortest path is represented in the 2D window 244 by a colored line 306 that follows the exact calculated path through the structural drawing and in the 3D window 242 by a red 3D floating poly line shape 308. See FIG. 18B. A visual display of the true scale measured path is also shown. After the path is calculated and visually plotted in both 3D and 2D windows 244, 242 the user can position the 3D window camera to the preferred structural entry point and easily visualize, and identify the beginning of the shortest path. The shortest path marker and path directions can be communicated to the fire rescue team or obtained by the team themselves on site. Additionally the calculated route can be automatically played back as a walkthrough animation allowing emergency personnel to see the entire route and all the building structural elements, objects of interest and hazards along the way.

Path Barrier Tool

FIG. 19 shows the Path Barrier Tool 360, which is used to graphically mark pathway obstructions and hazards that will prevent passage through a particular area or as a general hazard marker. The user selects the Barrier tool then graphically marks the affected area in either window to trigger the programmatic placement of a scaled visual "Do Not Enter" marker into the window data sets. This action accurately changes the visual geometry of the 3D and 2D scenes, 364, 362 respectively, and mathematically alters the makeup of the map matrix used by the Find Path Tool.

After the obstructed areas have been marked on at least one of the images or renderings, the invention can automatically or manually recalculate and visually render the shortest path options taking full consideration of the reduced route options. This tool 360 can be used by emergency response personnel to instantly and accurately update tactical response plans and instructions using real time events and user interaction with the invention to transform map and measurement data into site specific real time contextual intelligence.

Door Detection Tool

The Door Detection Tool 330, for instance, may be employed with the 3D window 242 and is used to automatically and programmatically count the doors in a selected path or virtually passed by the invention user. See FIG. 20. A running count may be visually displayed to the user of this tool in the 3D window. For instance, a dialogue box may appear to show each the left door count 332 and right door count 334. The total door count can be communicated to the fire rescue team or obtained by the team themselves on site. Fire rescue teams can use the Door Detection Tool to count the number doors or determine locations of doors in a selected path and even verify that they are on the right path. The Door Detection Tool is therefore also useful in mitigating navigation through low visibility environments.

3D Record Path Tool

The display/viewer 240 may also employ a 3D Record Path Tool 350. See FIG. 21. This tool 350 is best used with the 3D window 242, however with some modifications this tool could also be used in the 2D window 244.

The 3D Record Path Tool 350 allows application users to visually record every virtual movement and scene being viewed in the 3D window 242. When the 3D Record Path tool is turned on, the 3D camera's true scale start point 352, the exact path taken 354 and current position 356 in the 3D digital image are simultaneously and in real-time graphically displayed on the 2D digital image floor plan shown in the 2D window 244. The 3D window 242 will show the 3D view of the path 354 shown in the 2D window. Reference number 358 shows the 3D view taken at the current position 356 of the path 354 shown in the 2D window 244. So as the user virtually walks through the 3D floor plan model, the user's virtual position is directly associated to an exact coordinate on the original 2D floor plan. Also, the exact, true scale measurement of the path's length can be shown in the measurement box 400.

The visual marker used in the 2D window 244 may be a red line that is drawn in a visual layer on top of the 2D image. The red line will essentially trace the path the user is walking in the 3D view and plot marker points or route nodes along the way. A measurement dialog may be employed with the present invention to display the accurate measured length of the recorded path in real time using the embedded scale data.

Once the 3D Record Path tool is stopped, the user not only sees the exact path taken along with starting and ending points, but can replay the virtual 3D path that was walked in the 3D window 242 or save the entire 3D visual sequence, i.e. animated movie, out to a standard .avi, mp4 or a variety of other standard video formats for distribution.

The 3D Record Path functionality can be used in a variety of situations and contexts. For example, a user can create an accurate, to-scale virtual model of a museum floor plan by scanning paper drawings of a section of a museum. When the 3D digital image is created, any furniture, sculpture, and wall hanging art objects can be accurately modeled and represented inside the 3D museum floor plan. The application user could then walk through the virtual 3D museum and initiate the 3D Record Path tool to view an accurate visual representation (or movie) of the path taken. This may be useful to guide museum patrons through a museum exhibit, or allow a remote museum curator to view exact accurate museum and art layouts in another country without physically being present at the viewed museum. This tool could also be used to market materials and virtual art shows as well as to curate entire shows from remote locations without the expense of onsite visits.

In another instance, the 3D Record Path Tool could be employed by emergency crews to gain invaluable insight into the interior layouts of buildings during emergency situations. Using the 3D Record Path Tool, tactical information gathered on scene can be used in conjunction with the 3D floor plan models and allow users to gain a detailed, fully to-scale visual guide of emergency locations. Also, with this tool, the user can plot entry or exit routes in a structure, automatically view the entire length of the path in a true scale 3D animation and intelligently adjust the navigation path based on architectural and hazard elements that can only be visualized and incorporated into the digital images using the present invention. These recorded 3D floor plan visualizations can be used to make further tactical decisions based on the information being rendered and the novel manner of presentation at command and control or sent out into the field as pre-planning guides for emergency responders on scene. All these uses maintain accurate scale and measurement data throughout because of the embedded scale in the TIFF header. It should also be noted that the raster image created using the tools of the present invention is transmitted from one source to another maintaining true scale throughout the entire process and end user activity.

Evacuation Simulation Tool

The Evacuation Simulation Tool allows users of the 3D/2D synchronized viewer 240 to extend the data calculated by the shortest path tool 300 to larger scale simulations. In essence, once a shortest path has been calculated by the Shortest Path Tool 300 and the path has been graphically displayed in the 3D and 2D viewports, the end user can select the path in the 3D or 2D window and activate a new function through the right click menu.

This Evacuation Simulation tool would work with Population Density data encoded in the building 3D/2D data set to describe the number of persons that are in the vicinity of the Shortest Path Start Point. The Evacuation Simulation tool would then use the true scale dimension information embedded in the tiff header to calculate the dimension of the surrounding area and the area taken by the estimated population.

In combination with a virtual crowd simulation, point particle method or flock algorithm the Evacuation Simulation tool would then calculate how long it will take to move the total estimated number of people encoded in the Population Density data along the true scale calculated shortest path, through all the structural bottlenecks to the end path location. Users would simulate/select either a time of day or an incident description which would alter the estimated Population Density data in the building 3D and 2D data sets. Then the simulator would take into account the prepared density information for the various parts of the building that the path traverses. Time estimates would be displayed back to the end use as well as the ability to run a visual playback of the group of virtual people moving along the evacuation route.

Each of the tools described above can be used alone or in any combination. For instance, the user can combine the Find Shortest Path Tool 300, 301 and the 3D Record Path Tool 360 to not only follow the shortest path in one window that is simultaneously being plotted in the corresponding window, but also view a recorded movie of the selected path taken from the 3D digital rendering.

Using the present invention, the user may also manually record on either digital image the presence of additional hazards, obstructions or other data noticed on-scene or while watching the replay of the recorded 3D virtual path from the 3D Record Path Tool. This added information can be then distributed/relayed to the other emergency responders inside or within the real world building location or else where permitting quick entry and exit of the building. This feature allows emergency team leaders and command and control personnel to continually update their response plans as new information is obtained by using the invention. Information that, would in part, not be available to the end user without the invention.

Tracking Real World Emergency Responder

The true scale, coordinate-matched, linked in-real time, dual three-dimensional/two-dimensional visual display/viewer 240 can be used to track real world objects (assets) and simultaneously mark, graphically, their location on a 2D floor plan and as a corresponding object in the 3D window 242. This combination of contextually related visual environments enables the transformation of two independent streams of data into one coherent piece of information.

In practice an emergency responder can be outfitted with a transmitter/receiver device. These devices use a location method to identify where an asset is in relation to some scaled, coordinate based system. For example, as mentioned above, asset coordinates can be obtained in relation to the GPS Geographic Coordinate system or a localized location grid that creates a grid entity and ties asset location to a coordinate within that localized grid.

For example, a responder can be outfitted with a GPS device capable of receiving/transmitting location or identification signals to either a receiver location outside of a building or a receiver already existing within the structure which may be outfitted with a disaster proof signal repeating and amplifying unit. These repeating signals and amplifying units are designed to pick up the lower strength/lower powered personal GPS device signals and retransmit the signals to external receivers so that location data can be calculated.

In another example, the responder can also be outfitted with a radio transmitter and receiver, this can be referred to as the asset tag. In systems that are well known in the art, a localized set of computer connected mobile transceivers send out radio signals and receive signals back from the asset tags. The present invention may employ a triangulation or a multilateration method, known in the art, in detecting coordinates for an asset or emergency responder. Depending on the type of system implemented the asset tags location can be determined in reference to this localized grid in a variety of ways depending on the type, strength and broadcast reach of the asset tag and receiver stations.

Once an object's location (such as an emergency responder's location) is calculated using the methods described above the coordinate grid and scale can be translated to align with the coordinate system of the present invention. A reference point common among all the coordinate systems is established so that locations can be plotted in relation to this point.

The asset coordinate data of the emergency responder can be graphically rendered simultaneously using the 3D/2D dual visual display/viewer 240 of the present invention. As the asset location coordinate data is updated, the location of the object or emergency responder is also updated in the 3D and 2D digital images.

The display/viewer 240 and the tools of the present invention, provide the user with an understanding of the contextual 3D/2D visual environment by allowing the user to see an object's (or asset's) location rendered in a manner not realized by the prior art. The present invention is also useful as an analysis tool. For instance, if an asset is navigating a structure in a compromised, hazardous, or visually impaired situation the immediate dangers, percentage of route completion and alternative routes in reaction to changing conditions on scene can be evaluated and reacted to with information transformed by the present invention.

EXAMPLE

The present invention may be described using the below non-limiting example.

A fire is reported burning on the third floor of a four-story structure. The emergency responders uses a laptop 28a to access the floor plan data of the burning building either on-site or on route to the building. Once the floor is located, the emergency responder can open the desired digital images using the display/viewer 240 and manipulate the data in several different ways all of which can occur simultaneously.

The user can identify all entry and exit points for the structure using the 2D window 244 in the digital image display/viewer 240 and the select the Find Shortest Path Tool to determine the shortest and fastest path from one point on the floor to an exit point. Once the path has been calculated and visually plotted in both the 3D and 2D windows 242, 244 the user can place the 3D window camera to the preferred structural entry point or their current position in the building and view the calculated path. The 3D Record Path tool may be employed at this time to record the path taken in the 3D digital image (3D virtual model) of the building. This video can be replayed back or distributed by wire or wirelessly to other emergency personnel. Native to the standard video formats created, end users of this type of system transformed, user generated content will not need to be system users themselves to share in the visual intelligence.

If real-time, on-scene date being received by emergency crews indicates that the path shown by the Find Shortest Path tool is obstructed or cannot be taken, then the user can reroute the path using the Find Shortest Path tool to calculate another path to the exit point. Using the counterpart Barrier Tool 360 users can mark the hazard/obstruction identified by the on scene emergency crew in the 3D or 2D window triggering the simultaneous insertion of a visual to-scale representations of the obstruction. This visual representation can be of the actual obstruction or a geometric shape textured mapped with a globally standard emergency symbol. Users can mark multiple to scale barriers altering the data parameters of the mapped environment and ultimately affecting the intelligence and measured route options calculated from the underlying document image data. Finally, to assist the emergency personnel in way finding the smoke-filled floor, the Door Detection Tool may be used to count the number of doorways or entryways until the desired end point is reached. This data is essential to visually impaired environments where tactile verification is needed for navigation. This data can be found on almost any typical architectural floor plan but it must be manually tabulated along a desired route for the data to be meaningful or offer any usable intelligence. The use of the current invention overcomes this serious deficiency in the art.

If the building is internally equipped with a receiver/amplifier and the emergency responder involved in an interior attack or as part of a rescue company in a fire hot zone is equipped with a GPS device or radio transmitter, outside personnel may be able to visually track the responder's exact coordinate within the third floor of the building and verbally instruct the responder to any new occurrences or changes to the emergency situation or with additional information based on the systems visual display to assist the responder in dealing with conditions that they are discovering and reporting back to outside personnel in the interior of the building.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of tracking assets within a structure using a digital viewer in which the digital viewer includes a two dimensional display means displaying a two dimensional digital image of a scanned paper document of a structure, scale information of the paper document being embedded in a header of the two dimensional digital image, wherein the improvement comprises:

displaying a three dimensional rendering of said two dimensional digital image in a three dimensional display means, said three dimensional rendering having a three dimensional coordinate system, said three dimensional coordinate system being a non-rendered grid disposed on said three dimensional rendering, said two dimensional digital image having a two dimensional coordinate system, said two dimensional coordinate system being a non-rendered grid disposed on said two dimensional digital image;

providing a common coordinate system, wherein said common coordinate system is formed by matching said non-rendered grid of said two dimensional digital image to said non-rendered grid of said three dimensional rendering;

providing a receiver location about the structure; and providing an asset with a receiving/transmitting device;

wherein location of said asset within said structure can be detected on said common coordinate system, and wherein said two dimensional digital image is linked in real-time and coordinate matched with said three dimensional rendering.

2. The method of claim 1, wherein coordinates of said location of said asset is determined using a triangulation method on said digital viewer.

3. The method of claim 1, wherein coordinates of said location of said asset is determined using a multilateration method on said digital viewer.

4. The method of claim 1, wherein the receiving/transmitting device is a radio transmitter and receiver device.

5. The method of claim 1, wherein the receiving/transmitting device is a GPS device.

6. The method of claim 5, wherein the GPS device has a GPS coordinate system and a GPS scale, said GPS coordinate system and said GPS scale being translated to align with the common coordinate system.

7. The method of claim 1, further comprising a common referenced point, the grid of the 2D digital image and the grid of the 3D rendering being linked to the common referenced point.

8. The method of claim 7, wherein the common referenced point is a corner of a plan.

9. The method of claim 7, wherein the common referenced point is an upper-left corner of a plan serving as a 0,0 point.

* * * * *